US012632921B2

(12) United States Patent
Wang et al.

(10) Patent No.: US 12,632,921 B2
(45) Date of Patent: May 19, 2026

(54) SYSTEMS FOR IMAGE RESAMPLING AND ASSOCIATED METHODS

(71) Applicant: Intuitive Surgical Operations, Inc., Sunnyvale, CA (US)

(72) Inventors: Bai Wang, Palo Alto, CA (US); Pechin Chien Pau Lo, Santa Clara, CA (US); Sida Li, San Jose, CA (US); Gavin Jensen, San Francisco, CA (US); Joy Janku, San Francisco, CA (US); Sabrina A. Cismas, Saratoga, CA (US); Hui Zhang, San Jose, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 313 days.

(21) Appl. No.: 18/552,071

(22) PCT Filed: Apr. 5, 2022

(86) PCT No.: PCT/US2022/023523
§ 371 (c)(1),
(2) Date: Sep. 22, 2023

(87) PCT Pub. No.: WO2022/216735
PCT Pub. Date: Oct. 13, 2022

(65) Prior Publication Data
US 2024/0169480 A1 May 23, 2024

Related U.S. Application Data

(60) Provisional application No. 63/172,231, filed on Apr. 8, 2021.

(51) Int. Cl.
*G06T 3/4007* (2024.01)

(52) U.S. Cl.
CPC ................................... *G06T 3/4007* (2013.01)

(58) Field of Classification Search
CPC ................. G06T 3/4007; G06T 7/0012; G06T 2207/10081; G06T 2207/30004;
(Continued)

(56) References Cited

U.S. PATENT DOCUMENTS 6,380,732 B1    4/2002    Gilboa
6,389,187 B1    5/2002    Greenaway et al.
(Continued)

FOREIGN PATENT DOCUMENTS

JP        2008245742 A  * 10/2008
JP        2011067279 A  *  4/2011
(Continued)

OTHER PUBLICATIONS

3D-Doctor: Create More Accurate 3D Models Using Vector-Based Technologies, Answers to Frequently Asked Questions, Internet Citation, Apr. 5, 2004 (Apr. 5, 2004), Retrieved from the Internet: URL: http://www.web.archive.org/web/20040405071631/ http:// ablesw.com/3d-doctor/3dfaq.html , 35 pages.
(Continued)

*Primary Examiner* — Henok Shiferaw
*Assistant Examiner* — Woo C Rhim
(74) *Attorney, Agent, or Firm* — Haynes & Boone, LLP.

(57) ABSTRACT

Devices, systems, methods, and computer program products for performing medical procedures are disclosed herein. In some embodiments, a system for processing medical image data is configured to receive image data of a patient's anatomy. The system can select a first section of the image data, each image interval in the first section having an interval size within a predetermined size range. The system can identify a second section of the image data including at least one image interval having an interval size outside the
(Continued)

100

110
Receive image data

120
Determine whether the image data has an uneven interval size

130
Select a first section of the image data having an even interval size

140
Identify a second section of the image data having an uneven interval size

150
Generate a resampled second section having an even interval size by adding, deleting, and/or replacing one or more interpolated images in the second section 160
Output a combined section including the first section and the resampled second section predetermined size range. The system can generate a resampled second section by adding, deleting, and/or resampling one or more interpolated images in the second section, such that each image interval in the resampled second section has an interval size within the predetermined size range. The system can output a combined section including the first section and the resampled second section.

20 Claims, 11 Drawing Sheets

(58) Field of Classification Search
CPC ... G06T 11/005; G06T 15/08; G06T 2210/41; G06T 2207/10072; G06T 2207/10016; A61B 8/483
See application file for complete search history.

(56) References Cited

U.S. PATENT DOCUMENTS

| | | | |
|---|---|---|---|
| 7,316,681 | B2 | 1/2008 | Madhani et al. |
| 7,772,541 | B2 | 8/2010 | Froggatt et al. |
| 7,781,724 | B2 | 8/2010 | Childers et al. |
| 8,900,131 | B2 | 12/2014 | Chopra et al. |
| 9,259,274 | B2 | 2/2016 | Prisco |
| 9,452,276 | B2 | 9/2016 | Duindam et al. |

| | | | | |
|---|---|---|---|---|
| 2002/0180761 | A1* | 12/2002 | Edelson | G16H 40/63 |
| | | | | 345/634 |
| 2004/0047497 | A1* | 3/2004 | Daw | G06T 19/00 |
| | | | | 382/128 |
| 2006/0098006 | A1* | 5/2006 | Bohm | H04N 5/325 |
| | | | | 348/E5.088 |
| 2011/0002532 | A1* | 1/2011 | Frakes | G06T 7/11 |
| | | | | 382/154 |
| 2011/0075896 | A1* | 3/2011 | Matsumoto | G06T 3/4007 |
| | | | | 382/128 |
| 2020/0074591 | A1* | 3/2020 | Oleszkiewicz | G06T 3/4061 |
| 2020/0411166 | A1* | 12/2020 | Miyasa | G06T 11/006 |
| 2024/0169480 | A1* | 5/2024 | Wang | G06T 3/4007 |

FOREIGN PATENT DOCUMENTS

| | | | | | |
|---|---|---|---|---|---|
| JP | WO2010016293 | A1* | 1/2012 | | G06T 7/38 |
| JP | 6419441 | B2* | 11/2018 | | |

OTHER PUBLICATIONS

International Search Report and Written Opinion for Application No. PCT/US2022/023523, mailed on Jul. 19, 2022, 13 pages.
Vertut. J., and Coiffet, P., "Robot Technology: Teleoperation and Robotics Evolution and Development," English translation, Prentice-Hall, Inc., Inglewood Cliffs, NJ, USA 1986, vol. 3A, 332 pages.
International Preliminary Report on Patentability for Application No. PCT/US2022/023523, mailed Oct. 19, 2023, 08 pages.

* cited by examiner

SYSTEMS FOR IMAGE RESAMPLING AND ASSOCIATED METHODS

CROSS-REFERENCE TO RELATED APPLICATION(S)

This patent application is the U.S. National Stage patent application of International Patent Application No. PCT/US2022/023523 filed on Apr. 5, 2022 which claims priority to and the benefit of U.S. Provisional Application No. 63/172,231, filed Apr. 8, 2021, and entitled "Systems for Image Resampling and Associated Methods," each of which is incorporated by reference herein in its entirety.

TECHNICAL FIELD

The present disclosure is directed to systems, methods, and computer program products for processing image data, such as medical image data.

BACKGROUND

Minimally invasive medical techniques are intended to reduce the amount of tissue that is damaged during medical procedures, thereby reducing patient recovery time, discomfort, and harmful side effects. Such minimally invasive techniques may be performed through natural orifices in a patient anatomy or through one or more surgical incisions. Through these natural orifices or incisions, an operator may insert minimally invasive medical tools to reach a target tissue location. Minimally invasive medical tools include instruments such as therapeutic, diagnostic, biopsy, and surgical instruments. Medical tools may be inserted into anatomic passageways and navigated toward a region of interest within a patient anatomy. Navigation may be assisted using images of the anatomic passageways. Improved systems and methods are needed to accurately model the anatomic passageways.

SUMMARY

Disclosed herein are devices, systems, methods, and computer program products for processing image data. In some embodiments, a system for processing medical image data includes a processor and a memory operably coupled to the processor. The memory can store instructions that, when executed by the processor, cause the system to perform operations including receiving image data of a patient's anatomy, the image data including a sequence of images. The operations can include determining a first section of the image data, each image interval in the first section having an interval size within a predetermined size range. The operations can also include identifying a second section of the image data near the first section, the second section including at least one image interval having an interval size outside the predetermined size range. The operations can further include generating a resampled second section by adding, deleting, and/or resampling one or more interpolated images in the second section, each image interval in the resampled second section having an interval size within the predetermined size range. The operations can include outputting a combined section of the image data including the first section and the resampled second section.

In these and other embodiments, a non-transitory, computer-readable medium can store instructions thereon that, when executed by one or more processors of a computing system, cause the computing system to perform operations including receiving image data of a patient's anatomy, the image data including a sequence of images. The operations can include selecting a first section of the image data, each pair of consecutive images in the first section having an interval size within a predetermined size range. The operations can also include identifying a second section of the image data consecutive to the first section, the second section including at least one pair of consecutive images having an interval size outside the predetermined size range. The operations can further include generating a resampled second section by adding, deleting, and/or resampling one or more interpolated images in the second section, wherein each pair of consecutive images in the resampled second section has an interval size within the predetermined size range. The operations can include displaying a combined section of the image data including the first section and the resampled second section.

In these and still other embodiments, a method can include receiving image data of a patient's anatomy, the image data including a sequence of images. The method can include determining a first section of the image data having an even interval size. The method can also include identifying at least one second section of the image data near the first section, the at least one second section having an uneven interval size. The method can further include generating at least one resampled second section having the even interval size by adding, deleting, and/or resampling one or more interpolated images in the at least one second section. The method can include outputting a combined section of the image data including the first section and the at least one resampled second section.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments depicted, but are for explanation and understanding only.

DETAILED DESCRIPTION

Figure 1:
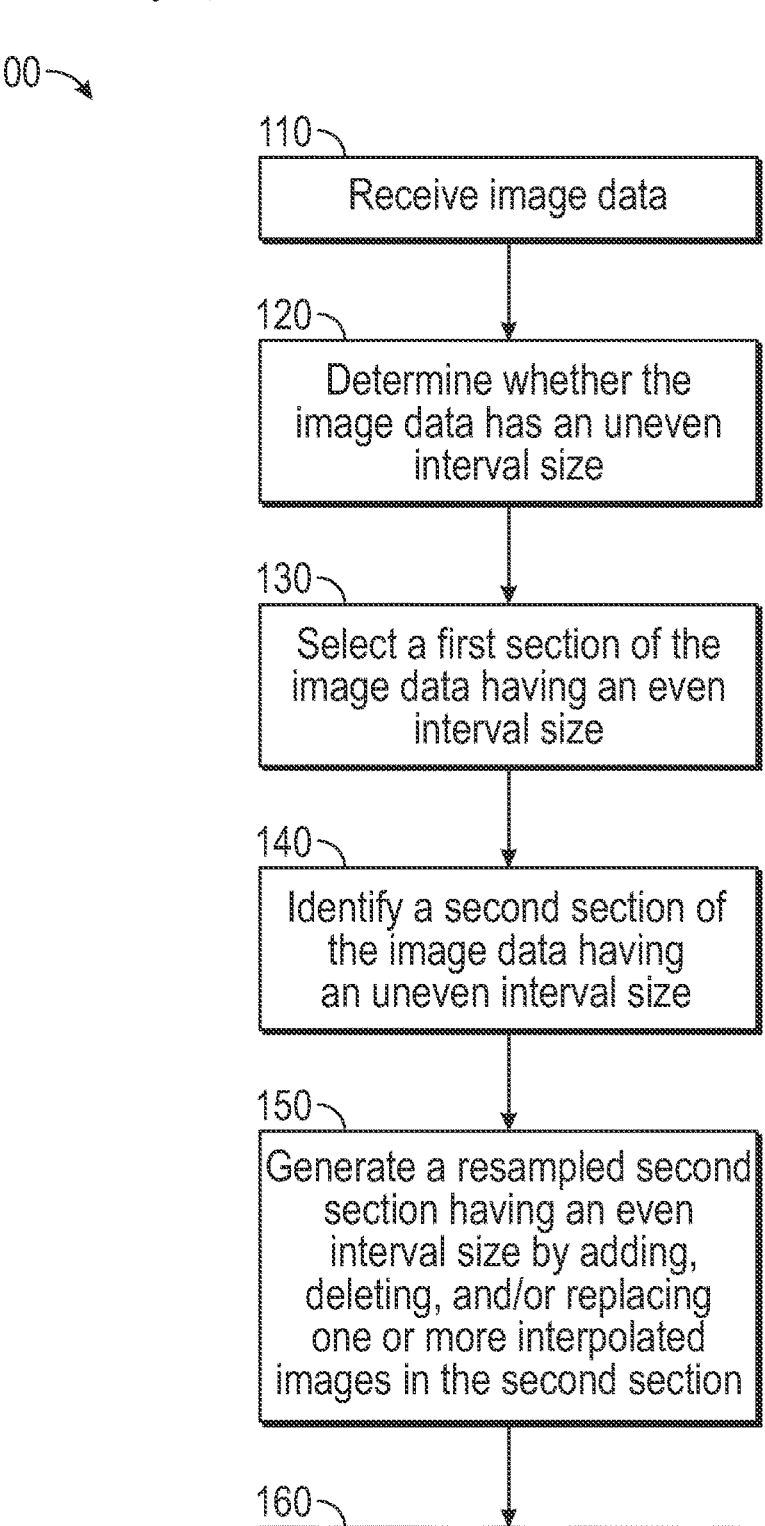
FIG. 1 is a flow diagram illustrating a method for planning a medical procedure in accordance with various embodiments.

The present disclosure is directed to devices, systems, methods, and computer program products for processing image data, e.g., for use in planning a medical procedure. In some embodiments, an image-guided medical procedure uses a three-dimensional (3D) model of an anatomic region to assist an operator in visualizing the patient anatomy and/or navigating a medical device within the anatomic region. The anatomic model can be generated from image data of the anatomic region, such as a sequence of computed tomography (CT) images or other images taken at specified intervals along the anatomy. However, the image data may sometimes include uneven intervals between images, e.g., due to file corruption, image download/transfer errors, imaging settings, and/or other issues. The model generation algorithm may not be able to accommodate uneven image intervals, or a model generated from image data with uneven intervals may not be sufficiently accurate for purposes of a medical procedure or other applications. Conventional approaches may simply discard any sections of the image data that include uneven intervals. However, if the remaining image data is insufficient for modeling (e.g., not enough remaining images, insufficient coverage of the anatomy), the medical procedure may be delayed or even canceled until new images can be obtained. Additionally, the patient's radiation exposure may be increased when multiple imaging sessions are required to correct image data issues.

The systems and methods disclosed herein can address these and other challenges by resampling the image data to generate a continuous section of images having even image intervals throughout. In some embodiments, for example, a system as described herein is configured to receive image data of a patient's anatomy (e.g., a sequence of CT images). The system can select a first section of the image data having even intervals (e.g., the image interval between each pair of consecutive images has an interval size within a predetermined range). The system can then identify a second section near the first section that has an uneven interval size (e.g., the image interval between at least one pair of consecutive images in the second section has an interval size outside the predetermined range). The system can process the second section by adding one or more interpolated images, deleting one or more original images, and/or otherwise resampling some or all of the image data in the second section. The resampled second section can have an even interval size, e.g., each image interval in the resampled second section has an interval size identical or similar to the interval size of the first section. The system can then output a combined section of the image data including the first section and the resampled second section. In some embodiments, the combined section is displayed via a graphical user interface including visual indicators distinguishing the interpolated images from the original images, thus allowing the operator to review the resampling results. The combined section can subsequently be used to generate a 3D model for use in planning and/or performing a medical procedure. The systems and methods described herein are expected to improve the flexibility of the planning process by allowing image data to be used even when there are uneven intervals. This approach is also expected to reduce the likelihood of the subsequent medical procedure being delayed or canceled due to unexpected issues with the image data.

A. EMBODIMENTS OF METHODS FOR PROCESSING IMAGE DATA

FIG. 1 is a flow diagram illustrating a method 100 for processing image data in accordance with various embodiments. The method 100 is illustrated as a set of steps or processes 110-160. All or a subset of the steps of the method 100 can by implemented by any suitable computing system or device, such as a control system of a medical instrument system or device (e.g., including various components or devices of a robotic or teleoperated system), a workstation, a portable computing system (e.g., a laptop computer), and/or a combination thereof. In some embodiments, the computing system for implementing the method 100 includes one or more processors operably coupled to a memory storing instructions that, when executed, cause the computing system to perform operations in accordance with the steps 110-160. The method 100 is illustrated in the following description by cross-referencing various aspects of FIGS. 2-5C. The method 100 may include fewer or additional steps, and steps may be performed in different orders than those shown.

The method 100 begins at step 110 with receiving image data of an anatomic region of a patient. The image data can include a sequence or series of images depicting passageways, structures, objects, and/or other features within the anatomic region. Optionally, the image data can depict one or more target sites within the anatomic region, such as a tissue to be biopsied, treated, etc., during a medical procedure. In some embodiments, for example, the anatomic region can be or include the airways of the patient's lungs, and the target site can be a biopsy target within the lungs (e.g., a lesion or nodule). As described above, the image data can be used to generate a 3D model for use in planning and/or performing a medical procedure in the anatomic region.

The image data can be or include any suitable preoperative and/or intraoperative image data of the anatomic region, such as CT data, cone beam CT (CBCT) data, tomosynthesis data, magnetic resonance imaging (MRI) data, fluoroscopy data, thermography data, ultrasound data, optical coherence tomography (OCT) data, thermal image data, impedance data, laser image data, nanotube X-ray image data, and/or other suitable data representing the patient anatomy. The image data can include two-dimensional (2D), 3D, or four-dimensional (e.g., time-based or velocity-based information) images. In some embodiments, for example, the image data includes 2D images from multiple perspectives that can be combined into pseudo-3D images.

Figure 2:
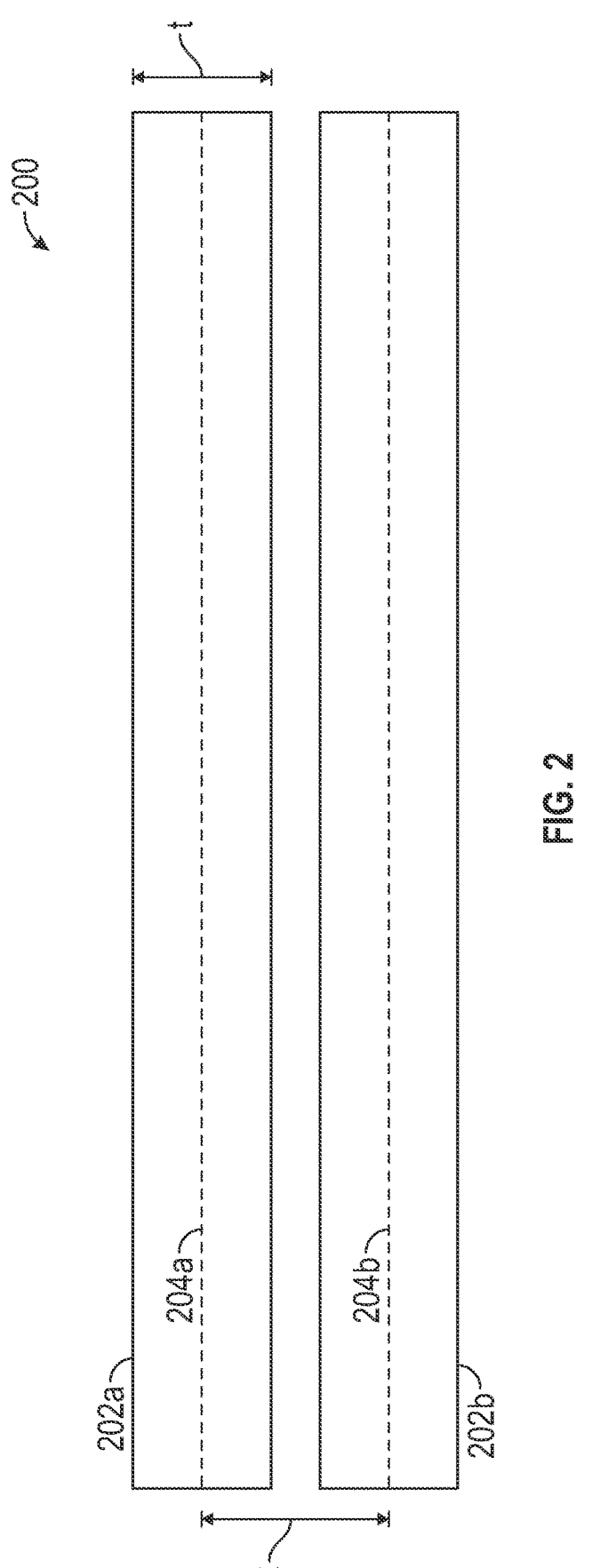
FIG. 2 is a schematic illustration of image data configured in accordance with various embodiments.

FIG. 2 is a schematic illustration of image data 200 configured in accordance with various embodiments. The image data 200 includes at least a first image 202*a* and a second image 202*b*. The images 202*a-b* can be individual sections or slices (e.g., CT slices) taken at different spatial locations along the patient anatomy (e.g., different locations along a superior-inferior axis, or any other suitable axis). As can be seen in FIG. 2, each of the images 202*a-b* has a thickness t (also known as the "image thickness" or "slice thickness"). In the illustrated embodiment, the images 202*a-b* are a consecutive and/or neighboring pair of image slices that are spaced apart by an interval x (also known as the "image interval" or "slice interval"). The size of the interval x (also known as the "interval size" or "interval spacing") can be the distance between the locations of the consecutive images 202a-b. In the illustrated embodiment, for example, the interval size is measured from a center 204a of the first image 202a to a center 204b of the second image 202b. The interval size can correlate to the imaging resolution, e.g., images obtained at a higher resolution have smaller interval sizes, while images obtained at a lower resolution have larger interval sizes. Although FIG. 2 depicts the interval x as being sufficiently large such that the images 202a-b are spaced apart from each other with no overlapping portions, in other embodiments, the thickness t and/or the interval size x of the images 202a-b can be varied such that the images 202a-b overlap and/or are contiguous with each other.

Referring again to FIG. 1, at step 120, the method 100 can include determining whether the image data has an uneven interval size. The image data can be considered to have an uneven interval size, for example, when there is too much variability in interval size and/or when at least some of the intervals between neighboring images are too large or too small. In some embodiments, the image data should ideally have an even interval size throughout the entire image sequence, or at least the sections of the sequence that cover key areas of the anatomic region (e.g., the target site and/or nearby passageways). However, uneven interval sizes may occur under certain circumstances, for example, if there are missing images, if certain images need to be excluded from the image data, and/or if the imaging is deliberately or inadvertently performed at different resolutions.

Figures 3A, 3B:
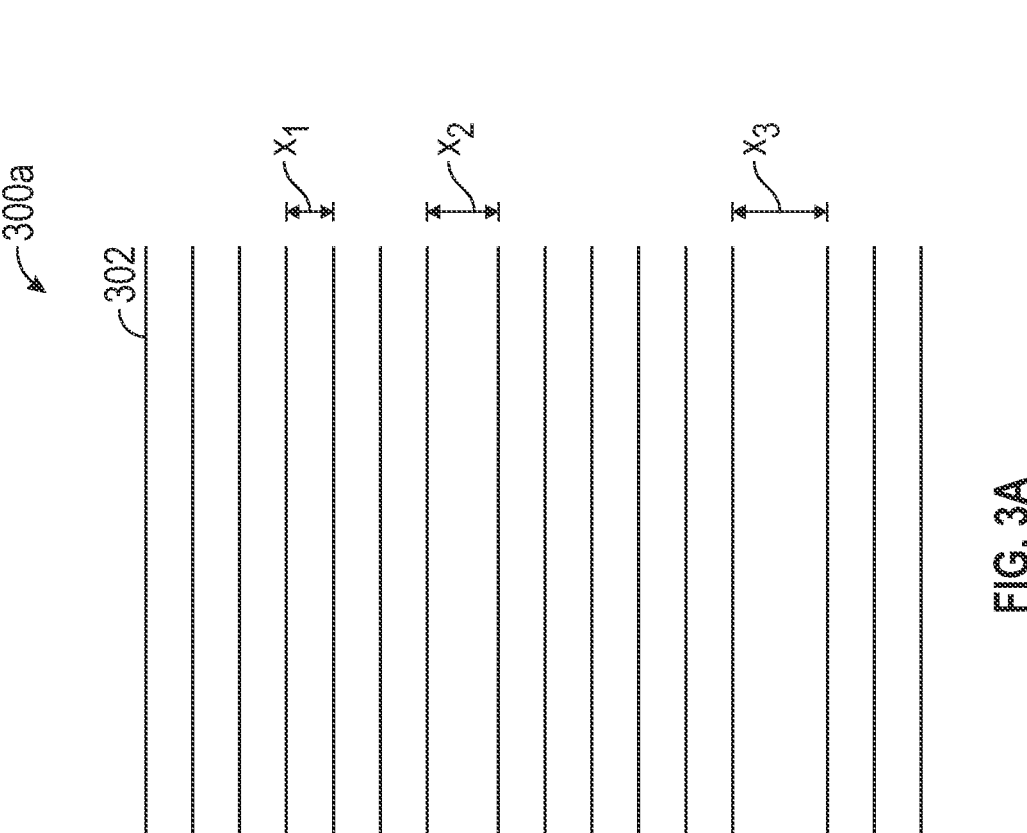
FIG. 3A schematically illustrates an example of image data having uneven intervals in accordance with various embodiments.
FIG. 3B schematically illustrates another example of image data having uneven intervals in accordance with various embodiments.

FIG. 3A schematically illustrates an example of image data 300a having uneven intervals in accordance with various embodiments. The image data 300a includes a sequence of images 302 taken at different spatial locations along the patient anatomy). In the illustrated embodiment, most of the images 302 in the image data 300a have an interval $x_1$ (FIG. 3A shows a single instance of interval $x_1$ merely for purposes of clarity). However, the image data 300a also includes images 302 separated by larger intervals $x_2$ and $x_3$, respectively. If intervals $x_2$ and $x_3$ are significantly larger than interval $x_1$ (e.g., outside expected statistical variability in the imaging process and/or greater than a certain threshold), the image data 300a can be considered to have uneven intervals. The uneven interval sizes shown in FIG. 3A may occur, for example, if there are missing images in the image data 300a (e.g., due to file corruption, data loss during file download or transfer) and/or if certain images are excluded from the image data 300a (e.g., due to being out-of-sequence or otherwise unsuitable for use).

FIG. 3B schematically illustrates another example of image data 300b having uneven intervals in accordance with various embodiments. In the illustrated embodiment, the image data 300b includes a central section 304 in which the images 302 are spaced apart by an interval $x_4$, and two peripheral sections 306a-b in which the images 302 are spaced apart by an interval $x_5$ larger than interval $x_4$. The uneven intervals depicted in FIG. 3B may occur, for example, if certain portions of the anatomy are deliberately or inadvertently imaged at different resolutions than other portions. In some instances, an operator may choose to image the central region of the anatomy (e.g., the region containing the target site) at a higher resolution than the peripheral regions of the anatomy (e.g., the regions superior and/or inferior to the target site) to reduce the radiation dose delivered to the patient.

Referring back to FIG. 1, step 120 can be performed automatically by a computing system or device, based on input from a human operator, or any suitable combination thereof. In some embodiments, step 120 includes applying various criteria to assess whether the image data has an even or uneven interval size. For example, the image data can be considered to have an even interval size if all of the image intervals in the image data have an interval size within a predetermined range (e.g., less than or equal to a threshold value, such as less than or equal to 5 mm, 4.5 mm, 4 mm, 3.5 mm, 3 mm, 2.5 mm, 2 mm, 1.5 mm, 1 mm, or 0.5 mm). The intervals do not need to be exactly identical, as long as any variations in the interval size are sufficiently small. For example, the variability in interval size can be less than or equal to 10%, 9%, 8%, 7%, 6%, 5%, 4%, 3%, 2% or 1% of the average or median interval size of the image data. The image data can be considered to have an uneven interval size if at least some of the image intervals in the image data have an interval size outside the predetermined range (e.g., greater than a threshold value, such as greater than 5 mm, 4.5 mm, 4 mm, 3.5 mm, 3 mm, 2.5 mm, 2 mm, 1.5 mm, 1 mm, or 0.5 mm). The image data can also be considered to have an uneven interval size if the variability in interval size is greater than 10%, 9%, 8%, 7%, 6%, 5%, 4%, 3%, 2% or 1% of the average or median interval size.

In other embodiments, however, other criteria can be used to determine whether the image data has an even or uneven interval size. For example, the image data can still be considered to have an even interval size as long as most of the intervals in the image data (e.g., at least 80%, 90%, 95%, or 99%) are within the predetermined range and/or have a sufficiently small amount of variability. Conversely, the image data can be designated as having an uneven interval size when a sufficiently large percentage of the intervals (e.g., at least 1%, 5%, 10%, 15%, or 20%) are outside the predetermined range and/or have too much variability.

Optionally, step 120 can include rejecting the image data altogether if there are too many occurrences of uneven interval sizes. For example, the image data can be rejected if at least 1%, 5%, 10%, 15%, 20%, 25%, or 50% of the intervals have an interval size outside the predetermined range and/or deviate too much from the median and/or average interval size. Alternatively or in combination, the image data can be rejected if at least two, three, four, five, 10, 20, 30, 40, or 50 intervals in the image data have an interval size outside the predetermined range, and/or exhibit too much variability. This approach can be used in embodiments where the method 100 is intended to address occasional instances of uneven intervals in the image data (e.g., due to missing and/or excluded images), rather than interval size issues that recur across large sections of the image data (e.g., due to the entire image sequence, or large sections thereof, being obtained with insufficient resolution). In other embodiments, however, the method 100 can be used to correct multiple instances of uneven interval sizes that recur throughout large sections of image data, or even the entirety of the image data.

At step 130, the method 100 continues with selecting a first section of the image data having an even interval size. The first section can be a section of the image data in which all or most of the intervals meet the predetermined criteria for even interval size. For example, as described above, the intervals between each pair of consecutive images can be within a predetermined interval size range (e.g., less than or equal to 5 mm, 4.5 mm, 4 mm, 3.5 mm, 3 mm, 2.5 mm, 2 mm, 1.5 mm, 1 mm, or 0.5 mm) and/or can exhibit a sufficiently small amount of variability (e.g., within 10%, 9%, 8%, 7%, 6%, 5%, 4%, 3%, 2% or 1% of the average or median interval size of the first section). Accordingly, the images in the first section can be suitable for downstream use (e.g., for generating a 3D model) with little or no resampling. In some embodiments, the interval size of the first section (e.g., the average and/or median interval size) defines the target interval size for the resampling processes in the subsequent steps of the method 100, as described further below. Thus, the first section can be a section of the image data having an image interval that is optimal or otherwise suitable for defining the target image interval for resampling other sections of the image data.

The first section can be selected in many different ways, e.g., automatically by a computing system or device, based on input from a human operator, or any suitable combination thereof. In some embodiments, for example, step 130 includes identifying one or more sections in the image data that have even interval sizes, and selecting the first section from those identified sections. The selection of the first section can be based on any suitable criteria. For instance, the first section can simply be the largest section having an even interval size. A section can be considered to be the "largest" based on the number of images in that section (e.g., the section with the greatest number of images) and/or the amount of coverage provided by that section (e.g., the section that covers the greatest total distance and/or volume of the patient anatomy). As another example, the first section can be the section that has the most coverage of the target site for the medical procedure and/or is closest to the target site. In a further example, the first section can be the section that is predicted to yield the largest section with an even interval size after the resampling processes described herein (e.g., after performing steps 140-160 of the method 100). In such embodiments, the first section may not be the largest initial section with an even interval size. Instead, the first section can be a smaller section that can subsequently be combined with one or more resampled sections to produce the largest continuous section with an even interval size, as discussed further below. Optionally, the resampling processes described herein can be performed multiple times with different first sections to determine which selection yields the best result.

Figure 4A:
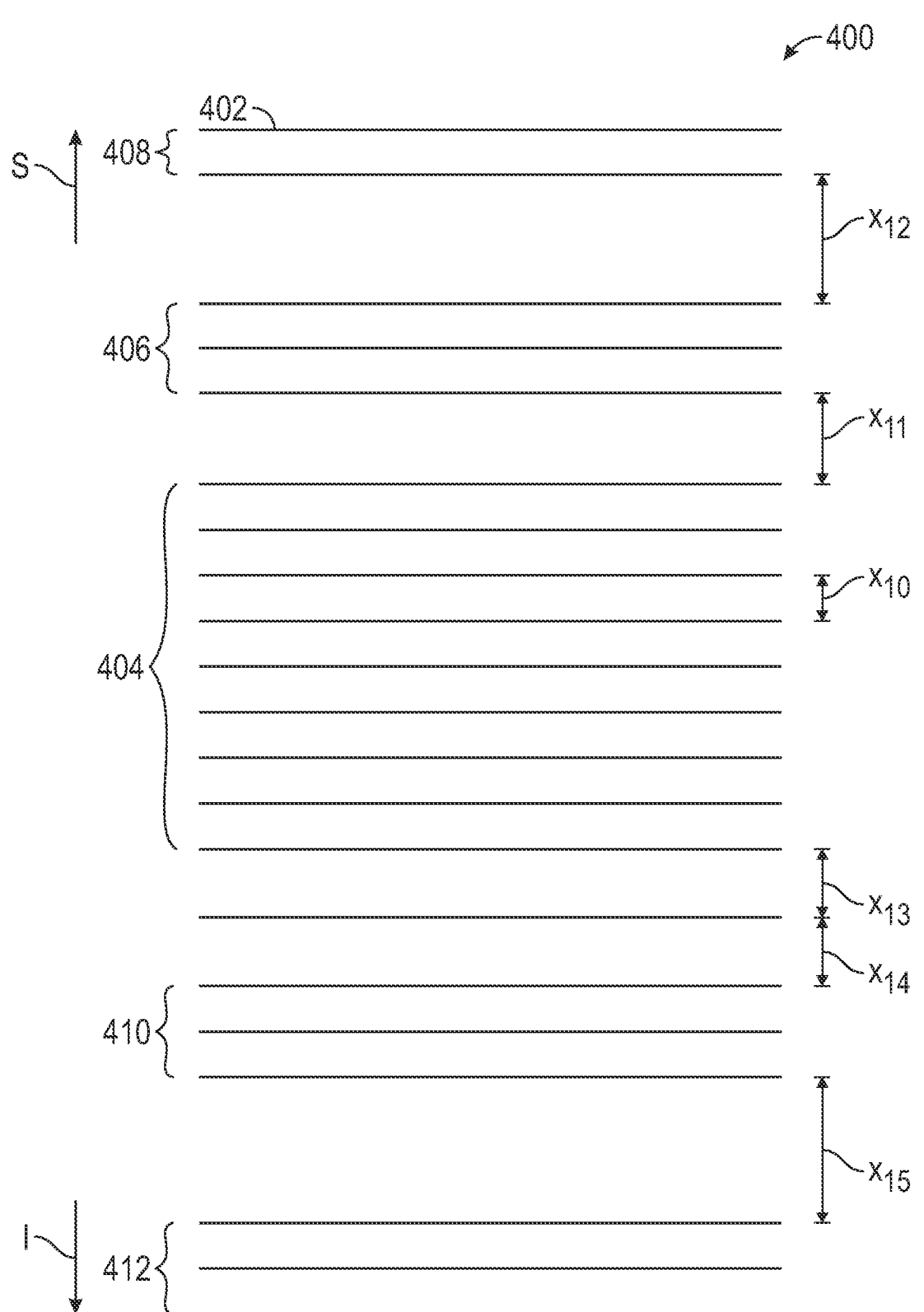
FIG. 4A is a schematic illustration of a process for selecting a first section of image data in accordance with various embodiments.

FIG. 4A schematically illustrates a process for selecting a first section of image data 400 in accordance with various embodiments. The image data 400 includes a sequence of images 402 (e.g., CT images). Although the images 402 are depicted as non-overlapping, this is merely for purposes of clarity, and in other embodiments some or all of the images 402 may overlap, as previously described with reference to FIG. 2. The images 402 can be obtained at different spatial locations, such as different positions along a superior-inferior axis as indicated by arrows S and I in FIG. 4A. In the illustrated embodiment, some of the images 402 in the image data 400 have an interval $x_{10}$ (a single instance of interval $x_{10}$ is shown merely for purposes of clarity), while other images 402 have different (e.g., larger) intervals $x_{11}$-$X_{15}$. The interval $x_{10}$ can be within a predetermined range (e.g., less or equal than 2 mm), while the intervals $x_{11}$-$x_{15}$ can be outside the predetermined range (e.g., greater than 2 mm). Accordingly, sections 404-412 of the image data 400 can each be designated as having an even interval size because each pair of consecutive images 402 in the sections 404-412 has the same or similar interval $x_{10}$. In the embodiment of FIG. 4A, section 404 is selected as the first section in step 130 of the method 100 (FIG. 1) because it is the largest section having an even interval size. In other embodiments, however, the selection of the first section can be based on other criteria, as previously discussed.

Referring again to FIG. 1, at step 140, the method 100 includes identifying a second section of the image data having an uneven interval size. The second section can be a section of the image data in which at least one image interval does not meet the predetermined criteria for even interval size. For example, as described above, the second section can include at least one pair of consecutive images having an interval size outside the predetermined size range (e.g., greater than 2 mm) and/or exhibiting too much variability (e.g., more than 5% variation from the median and/or average interval size of the first section). The second section can be near (e.g., adjacent to and/or consecutive with) the first section such that, after resampling, the second section can be combined with the first section to generate a continuous section of image data with an even interval size. For example, the second section can include one or more images in a first (e.g., superior) direction relative to the first section, and/or one or more images in a second (e.g., inferior) direction relative to the first section. The identification of the second section can be performed automatically by a computing system or device, based on input from a human operator, or any suitable combination thereof.

In some embodiments, the second section is selected based on one or more additional criteria to ensure that the second section is suitable for resampling (e.g., the intervals are not too large for interpolation). For example, the additional criteria can limit the intervals in the second section to an interval size less than or equal to a maximum interval size (e.g., less than or equal to 5 mm, 4.5 mm, 4 mm, 3.5 mm, 3 mm, 2.5 mm, 2 mm, 1.5 mm, 1 mm, or 0.5 mm). The maximum interval size can be outside the predetermined size range for even interval size (e.g., greater than 2 mm), but can still be sufficiently small for resampling purposes (e.g., less than or equal to 2.5 mm or 4 mm).

Optionally, the maximum interval size can be determined based, at least in part, on a permitted amount of interpolation between images. In some embodiments, the resampling processes described herein limit the number of images that may be interpolated between a consecutive pair of original images, e.g., to ensure that the resampled image data is sufficiently accurate for generating an anatomic model. The maximum number of interpolated images per interval can be any suitable number, such as no more than five, four, three, two, or one interpolated image per interval. The maximum interval size can be calculated based on the maximum number of interpolated images and the target interval size after resampling. For example, if only one interpolated image per interval is allowed and the target interval size after resampling is 2 mm, then the maximum interval size before resampling can be 4 mm.

Figure 4B:
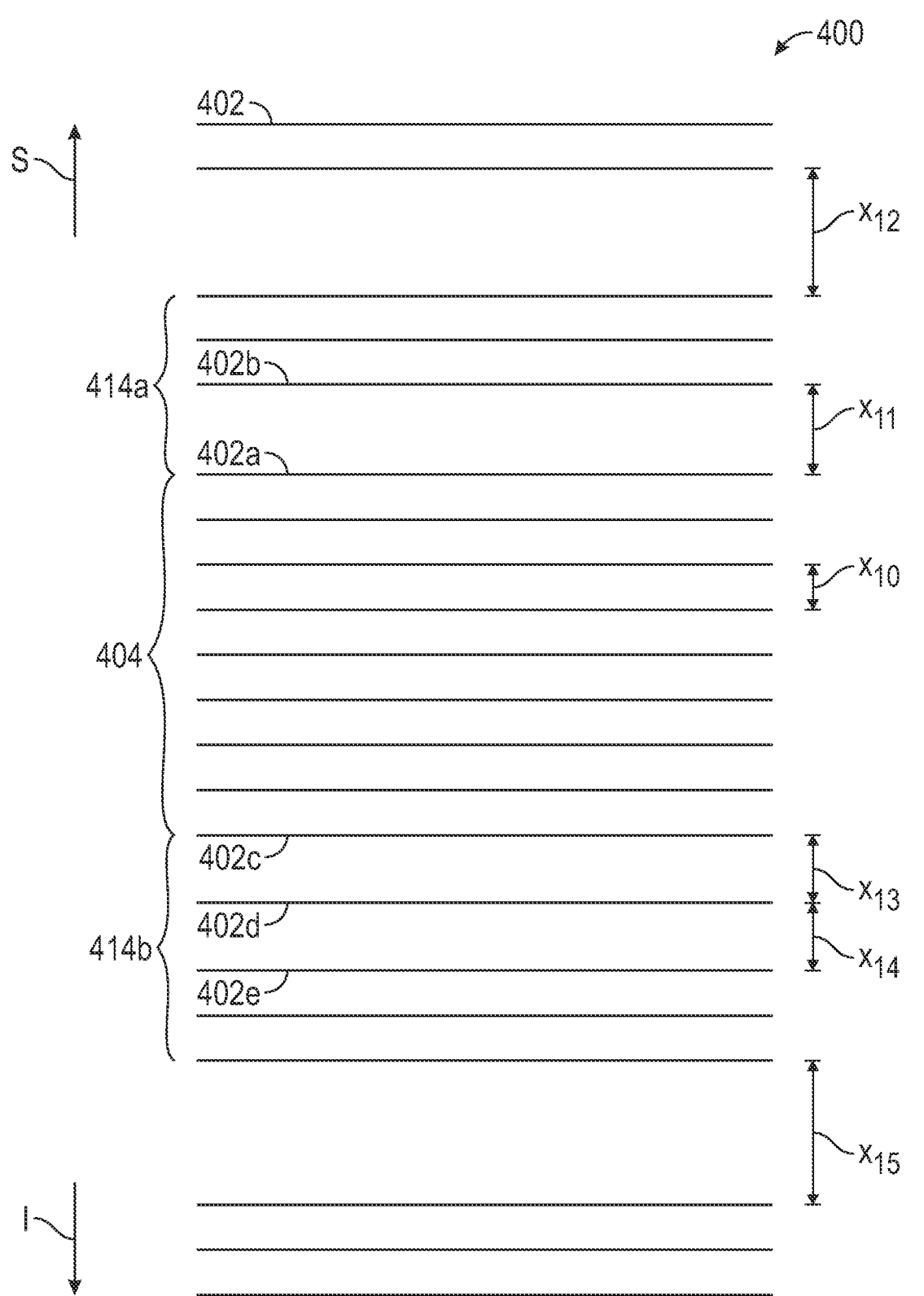
FIG. 4B is a schematic illustration of a process for identifying a second section of the image data of FIG. 4A in accordance with various embodiments.

FIG. 4B schematically illustrates a process for identifying a second section of the image data 400 of FIG. 4A in accordance with various embodiments. As previously described with respect to FIG. 4A, the image data 400 can include a first section 404 having even intervals $x_{10}$. In some embodiments, the selection process of step 140 of the method 100 (FIG. 1) includes searching upwards from the uppermost image 402a in the first section 404 until reaching an interval that is larger than the maximum permitted interval size. In the illustrated embodiment, interval $x_{11}$ between images 402a and 402b is less than or equal to the maximum interval size, while interval $x_{12}$ is greater than the maximum interval size. Accordingly, the second section can include at least some or all of the images 402 between the uppermost image 402a of the first section 404 and the interval $x_{12}$ (e.g., labeled section 414a in FIG. 4B).

Alternatively or in combination, the selection process of step 140 (FIG. 1) can include searching downwards from the lowermost image 402c in the first section 404 until reaching an interval larger than the maximum interval size. In the illustrated embodiment, for example, interval $x_{13}$ between images $402c$ and $402d$, and interval $x_{14}$ between images $402d$ and $402e$, are both less than or equal to the maximum interval size. In contrast, interval $x_{15}$ is greater than the maximum interval size. Accordingly, the second section can include at least some or all of the images $402$ between the lowermost image $402c$ and the interval $x_{15}$ (e.g., labeled section $414b$ in FIG. 4B).

Referring again to FIG. 1, at step $150$, the method $100$ continues with generating a resampled second section having an even interval size by adding, deleting, and/or resampling one or more interpolated images in the second section. For example, step $150$ can include any of the following processes: (a) adding additional images to the image data (e.g., one or more additional images generated by interpolation or other processes), thus increasing the total number of images, (b) removing images from the image data (e.g., removing one or more original images), thus decreasing the total number of images, and/or (c) replacing some or all of the image data with new image data (e.g., one or more new images generated by interpolation or other processes), which can increase or decrease the total number of images, or can maintain the same total number of images. In some embodiments, images can be added to the image data in order to replace some or all of the original images, or can be added without replacing any of the original images. Similarly, images can be deleted from the original image data with or without being replaced with new images.

The interpolated images can be generated using any suitable resampling algorithm known to those of skill in the art, such as a volume resampling algorithm. In some embodiments, the resampling algorithm adds one or more interpolated images to the second section in order to change the interval size of the second section from an initial (e.g., uneven) interval size to a target (e.g., even) interval size. The target interval size can fulfill some or all of the predetermined criteria for even interval size previously described herein (e.g., no more than 2 mm). The algorithm can generate the interpolated image(s) based on one or more original images in the image data. For example, the interpolated image(s) can be generated from a pair of consecutive original images, e.g., a pair of original images having an interval size exceeding the target interval size. The interpolated image(s) can be inserted into the interval between the original images so that the interval size after resampling is equal or approximately equal to the target interval size. As discussed above, the number of interpolated images may be limited. e.g., to no more than one or two interpolated images per interval.

In some embodiments, the target interval size for the resampled second section is based, at least in part, on the interval size of the first section of step $130$. For example, the target interval size of the resampled second section (e.g., median and/or average interval size) can be identical or similar to the interval size (e.g., median and/or average interval size) of the first section. Alternatively or in combination, the resampling can be performed such that each interval in the resampled section exhibits no more than 10%, 9%, 8%, 7%, 6%, 5%, 4%, 3%, 2% or 1% variability from the median and/or average interval size of the first section. This approach can allow the resampled second section to be combined with the first section to generate a continuous section of image data with an even interval size, as described below in connection with step $160$.

In some embodiments, the resampling process of step $150$ includes adding at least one interpolated image to the second section without replacing any original images in the second section. For example, one or more interpolated images can be added to the interval between a pair of original images, such that the resampled second section includes both the interpolated image(s) and the pair of original images. This approach may be used in situations where the second section can be resampled to an even interval size simply by adding interpolated images at the appropriate locations. Such situations may occur, for example, if the interval between the original images is an integer multiple of the target interval size (or is sufficiently close to being an integer multiple, such as within 5%). For instance, if the target interval size is 2 mm and the original image interval is equal or approximately equal to 4 mm, the resampling process can include inserting a single interpolated image into the interval to produce a resampled interval size of 2 mm, without replacing any of the original images.

In other embodiments, however, the resampling process can include deleting and/or replacing some or all of the original images in the second section with one or more interpolated images. This approach may be used in situations where simply adding interpolated images to the second section would not produce even interval sizes. Such situations may occur, for example, if the original image interval is not an integer multiple of the target interval size (or is not sufficiently close to being an integer multiple). For instance, if the target interval size is 2 mm and the original image interval is 3 mm, inserting a single interpolated image between the original images would produce an interval size of 1.5 mm. In such embodiments, some or all of the original images can be deleted and replaced with additional interpolated images to produce a resampled section having the target interval size of 2 mm throughout. The additional interpolated images can be generated based on original image data in accordance with the interpolation constraints described above (e.g., no more than five, four, three, two, or one interpolated image between each pair of neighboring original images).

Figure 4C:
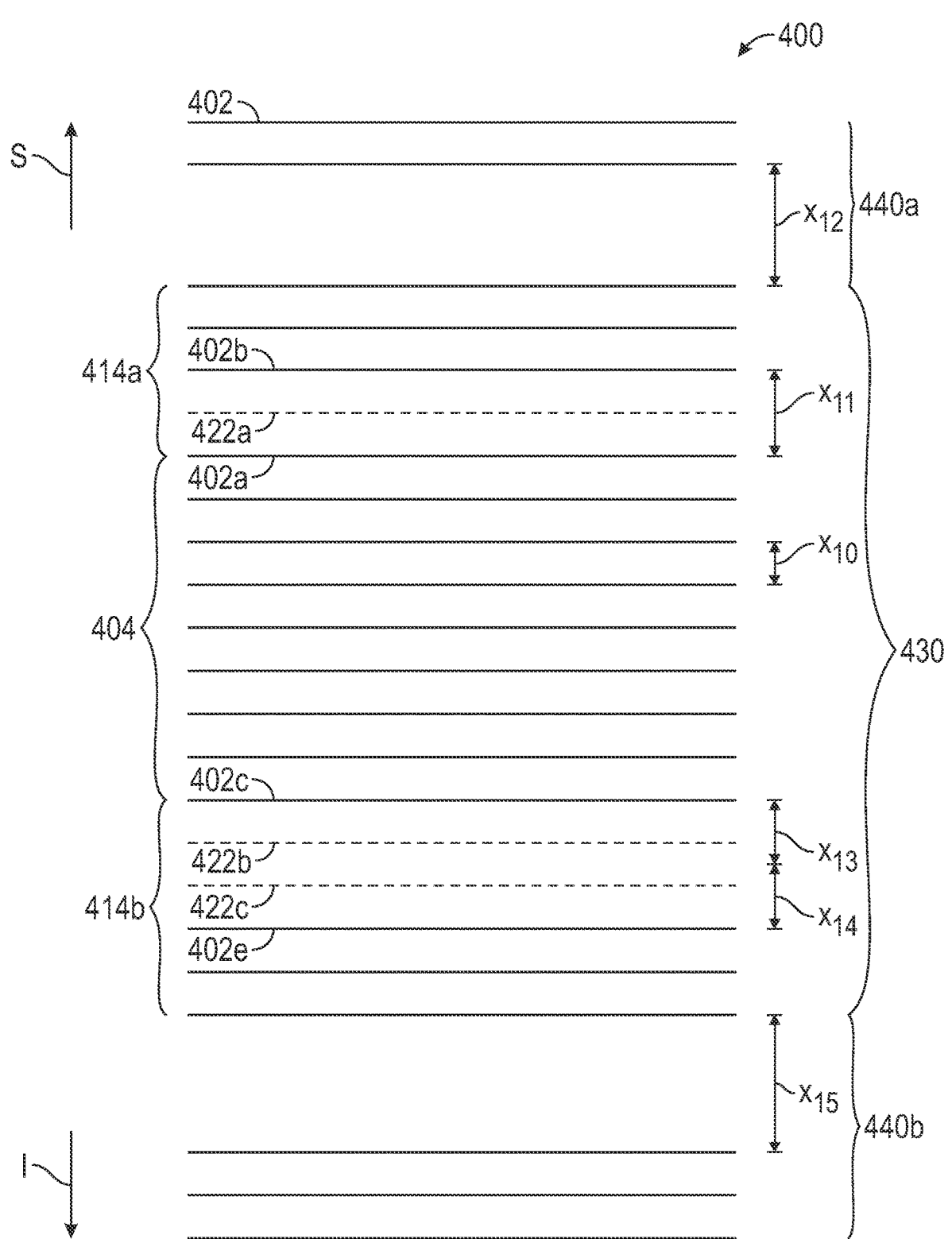
FIG. 4C is a schematic illustration of a process for resampling the second section of the image data of FIG. 4B in accordance with various embodiments.

FIG. 4C schematically illustrates a process for resampling the second section of the image data $400$ of FIG. 4B in accordance with various embodiments. As previously described with reference to FIG. 4B, the second section can include the section $414a$ superior to the first section $404$ and/or the section $414b$ inferior to the first section $404$. The interval $x_{10}$ of the first section $404$ can provide the target interval size for resampling the sections $414a$-$b$. In the illustrated embodiment, the interval $x_{11}$ in section $414a$ is an integer multiple of the interval $x_{10}$ (e.g., interval $x_{11}$ is 2 times the size of interval $x_{10}$). Accordingly, the resampling process of step $150$ of the method $100$ (FIG. 1) can simply include adding an interpolated image $422a$ into the interval $x_{11}$, without replacing any of the original images $402$ (e.g., images $402a$-$b$) in section $414a$. After the interpolated image $422a$ has been added to section $414a$, all the intervals in section $414a$ can be the same or similar as the interval $x_{10}$ of the first section $404$.

In the embodiment of FIG. 4C, intervals $x_{13}$ and $x_{14}$ in section $414b$ are not integer multiples of the interval $x_{10}$ (e.g., intervals $x_{13}$ and $x_{14}$ are each 1.5 times the size of interval $x_{10}$). Accordingly, the resampling process of step $150$ (FIG. 1) can include replacing original image $402d$ (FIG. 4B) with interpolated images $422b$-$c$ so that all the intervals in resampled section $414b$ have the same or substantially the same target interval size (e.g., the same interval size as interval $x_{10}$). In some embodiments, the interpolated image $422b$ is generated from and located between original images $402c$ and $402d$ (FIG. 4B), while the interpolated image 422$c$ is generated from and located between original images 402$d$ (FIG. 4B) and 402$c$. Thus, the resampling process shown in FIG. 4C still only interpolates a single image between each pair of consecutive original images.

Referring again to FIG. 1, at step 160, the method 100 can include outputting a combined section including the first section and the resampled second section. The combined section can be a continuous sequence of images having an even interval size throughout (e.g., most or all intervals in the combined section are within the predetermined range and/or have sufficiently low variability). Optionally, step 160 can further include evaluating whether the combined section meets additional criteria, e.g., to assess the suitability of the combined section for generating an anatomic model or other subsequent applications. For example, too few images in the combined section can raise accuracy concerns, while too many images can cause performance issues during model generation. In such embodiments, step 160 can include determining whether the number of images in the combined section is within a target range. The target range for the combined section can be any suitable range, such as greater than or equal to 10, 20, 30, 40, 50, 60, 70, 80, 90, or 100 images; and/or less than or equal to 1500, 1400, 1300, 1200, 1100, or 1000 images. If the combined section has too few and/or too many images, step 160 can include outputting a notification alerting the operator that the image data is not suitable for use and that corrective action is needed (e.g., new image data should be acquired). Optionally, if the combined section has too many images, some of the images can be removed, rather than simply rejecting the image data altogether. For example, images can be automatically trimmed from the combined section (e.g., from the inferior and/or superior portions of the combined section), the operator can manually select images to be removed, or any other suitable approach.

Alternatively or in combination, step 160 can include determining whether the combined section provides sufficient coverage of the patient anatomy. In some embodiments, for example, the combined section should cover the target site for the medical procedure, as well as anatomic regions near the target site (e.g., to facilitate path planning and/or navigation to the target site). Accordingly, it may be permissible to exclude sections of the image data that cover portions of the anatomy sufficiently far away from the target site and/or other anatomic regions of interest. For example, the combined section can still be considered suitable for use even if some images at the peripheral portions (e.g., superior and/or inferior portions) of the original image data are not included in the combined section. Conversely, the combined section may be considered unsuitable if too many images from the original image data are excluded, even if those images are located at the peripheral portions of the original image data. In such embodiments, step 160 can include outputting a notification alerting the operator that the image data is not suitable for use and that corrective action is needed.

Referring again to FIG. 4C, the first section 404, resampled section 414$a$ (including the interpolated image 422$a$), and resampled section 414$b$ (including the interpolated images 422$b$-$c$) can be combined to form a combined section 430. As shown in FIG. 4C, the combined section 430 is a continuous section of the image data 400 having an even interval size throughout (e.g., each image interval is the same or similar to the size of interval $x_{10}$). In the illustrated embodiment, section 440$a$ (e.g., the superior end of the image data 400) and section 440$b$ (e.g., the inferior end of the image data 400) are not included in the combined section 430 because they each include intervals (e.g., intervals $x_{12}$ and $x_{15}$) that are too large for resampling, as previously discussed. The combined section 430 can be considered suitable for use if the distance covered by each of the excluded sections 440$a$-$b$ is below a respective coverage threshold. For example, the coverage threshold for each of the excluded sections 440$a$-$b$ can each independently be less than or equal to 100 mm, 90 mm, 80 mm, 70 mm, 60 mm, 50 mm, 40 mm, 30 mm, 20 mm, or 10 mm. The excluded sections 440$a$-$b$ can have the same coverage threshold, or can have different coverage thresholds (e.g., the coverage threshold for the section 440$a$ can be less than the coverage threshold for the section 440$b$, or vice-versa). For example, it may be permissible to exclude more images 402 from the inferior end of the image data 400 versus the superior end of the image data 400, or vice-versa. In some embodiments, the combined section 430 is considered suitable if the coverage of the section 440$a$ is no more than 30 mm and/or the coverage of the section 440$b$ is no more than 50 mm.

Referring again to FIG. 1, in some embodiments, step 160 further includes outputting a graphical user interface displaying the images of the combined section. The graphical user interface can include visual indicators such as labels, markings, coloring, icons, etc., to distinguish original images in the combined section from the interpolated images that were added in step 150. The graphical user interface can also display a notification (e.g., a message) alerting the operator that resampling was performed and that the interpolated images should be reviewed to confirm accuracy. Accordingly, the operator can use the graphical user interface to view the results of the resampling processes described herein and, if appropriate, approve, reject, or modify the image data.

Figure 5A:
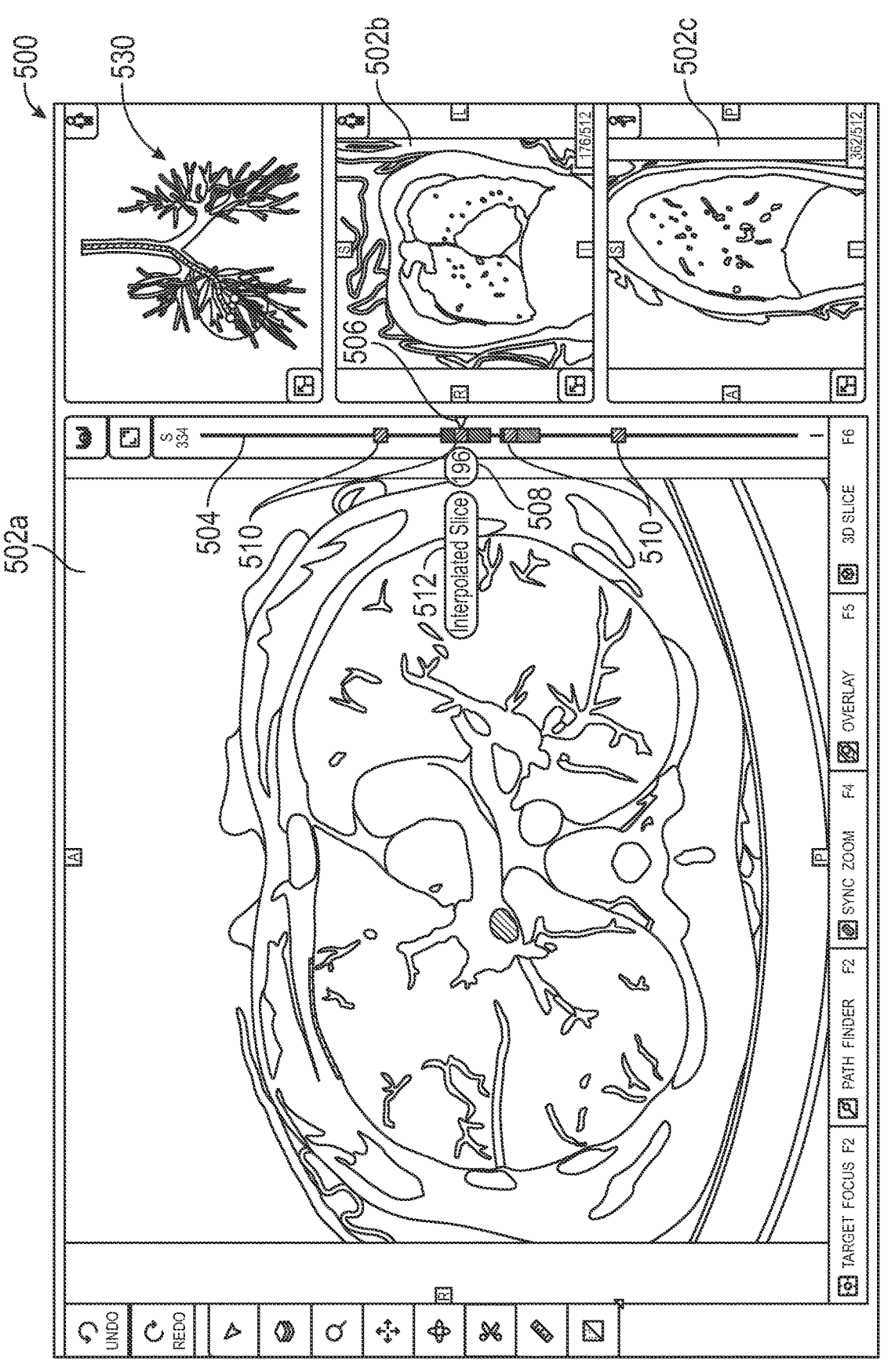
FIGS. 5A-5C illustrate a representative example of a graphical user interface configured in accordance with various embodiments.
Figure 5B:
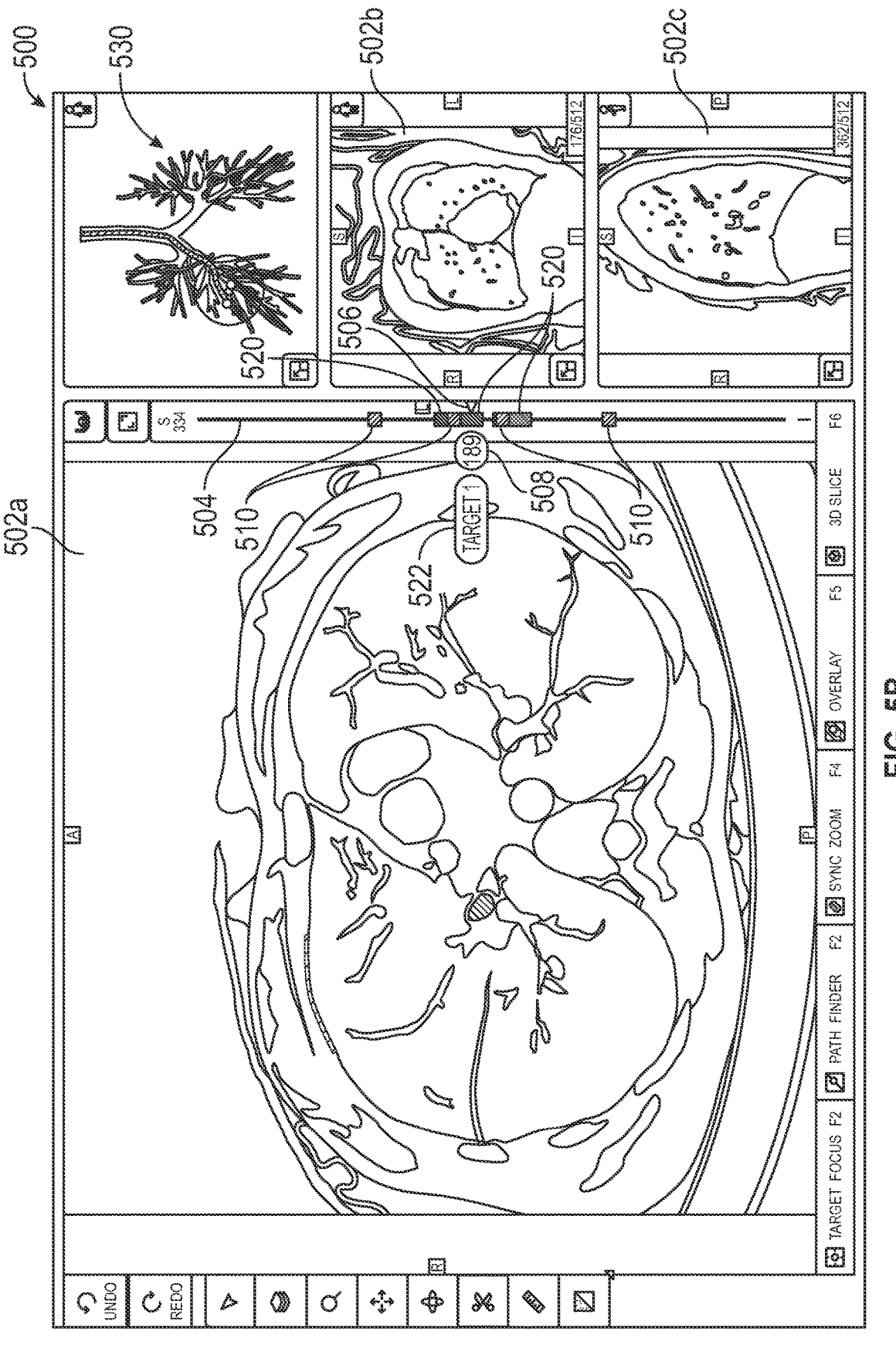
Figure 5C:
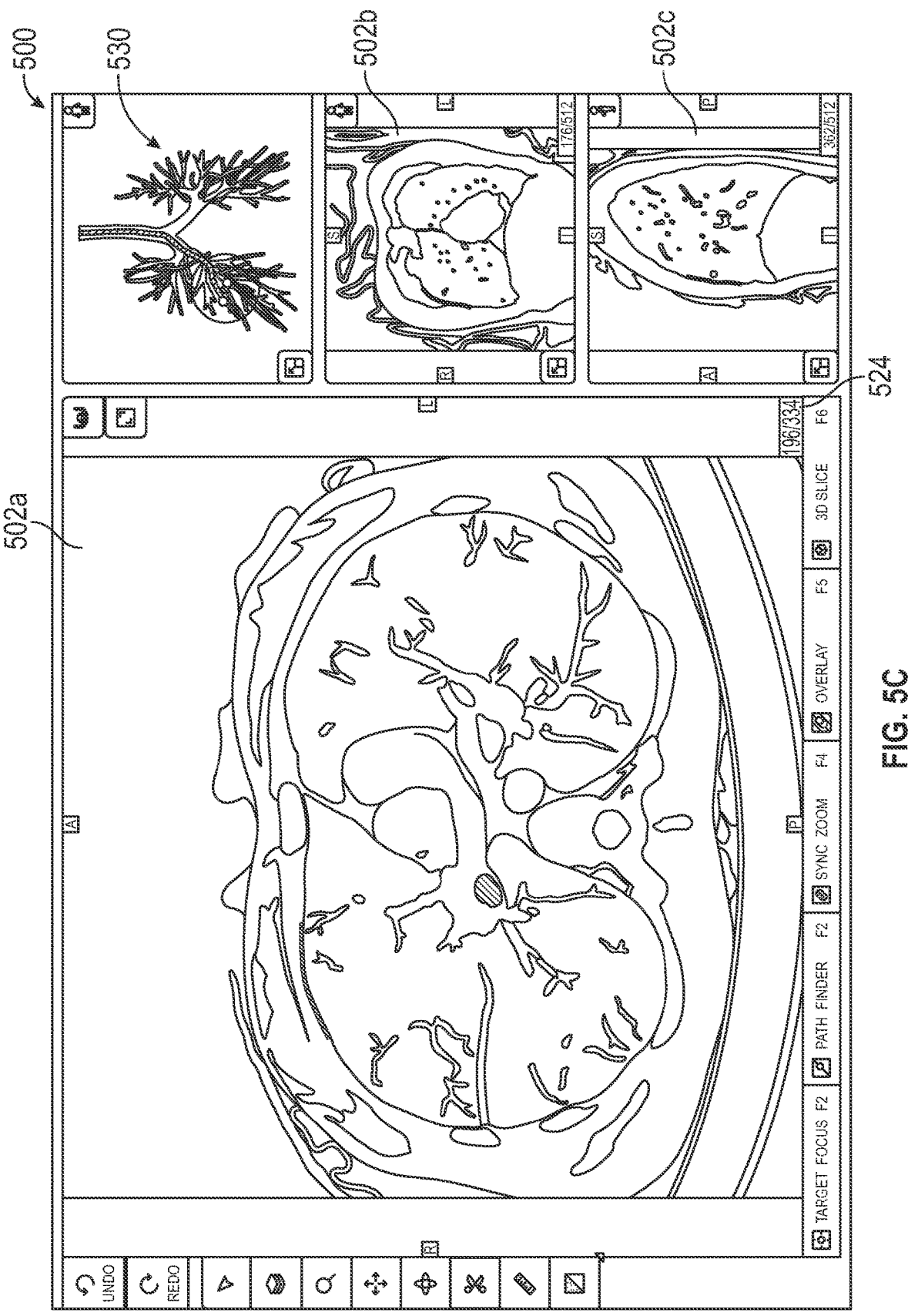

FIGS. 5A-5C illustrate a representative example of a graphical user interface 500 ("interface 500") configured in accordance with embodiments. Referring first to FIG. 5A, the interface 500 can display one or more images of an anatomic region, such as a first image 502$a$, a second image 502$b$, and a third image 502$c$. Each of the images 502$a$-$c$ can be a different individual slice or section from a sequence of images (e.g., a sequence of CT images). In the illustrated embodiment, the images 502$a$-$c$ each depict a different view and/or plane of the anatomy, e.g., the first image 502$a$ shows an axial plane, the second image 520$b$ shows a coronal plane, and the third image 502$c$ shows a sagittal plane. In other embodiments, however, the interface 500 can include a different number of images (e.g., one, two, four, or more) and/or the images can depict different views (e.g., different cardinal planes, one or more planes oblique to a cardinal plane, etc.). The interface 500 can include visual elements indicating anatomic directions so the operator can identify the displayed views (e.g., "L" for left, "R" for right, "S" for superior, "I" for inferior, "A" for anterior, "P" for posterior; icons representing the patient orientation; etc.). The interface 500 can allow the operator to pan, zoom in, zoom out, scroll through different image slices or sections, and/or otherwise manipulate the images 502$a$-$c$.

The images 502$a$-$c$ can each be part of a combined section of image data generated in accordance with the method 100 of FIG. 1. The interface 500 can display various graphical elements to assist the operator in reviewing the combined section. For example, the interface 500 can include a slider element 504 allowing the operator to navigate through the images in the combined section. The slider element 504 can be or include an elongated bar, line, etc., that visually represents the locations of the images in the combined section. In the illustrated embodiment, the slider element

504 shows the image locations along a superior-inferior axis, as indicated by the "S" and "I" labels at the ends of the of the slider element 504. In other embodiments however, the slider element 504 can show image locations along an anterior-posterior axis, left-right axis, or any other suitable axis.

As shown in FIG. 5A, the first image 502a is the main image displayed in the interface 500, and the slider element 504 is positioned to one side of the first image 502a. The slider element 504 can include an arrow 506 or other visual indicator showing the location of the first image 502a in the combined section (e.g., based on the slice number of the first image 502a). The position of the arrow 506 can be updated as the operator views different first images 502a. For example, as the operator scrolls through different image slices along the axis, the interface 500 can move the arrow up or down along the slider element 504 to reflect the location of the currently displayed first image 502a. Optionally, the operator can select a position along the slider element 504 (e.g., by clicking on or near the slider element 504), and the interface 500 can switch the displayed first image 502a to the image slice at the corresponding location along the axis. The interface 500 can also display a first label 508 near the slider element 504 showing the slice number of the currently displayed first image 502a.

The slider element 504 also includes a set of first visual indicators 510 (e.g., markers, shapes, icons, etc.) representing the locations of any interpolated images in the image data. When the operator selects one of the first visual indicators 510 (e.g., by clicking on or near the first visual indicator 510), the interface 500 can switch the displayed first image 502a to show the corresponding interpolated image slice. The interface 500 can also show a second label 512 (e.g., "Interpolated Slice") alerting the operator that the displayed first image 502a is an interpolated image, rather than an original image. The second label 512 can be positioned near the slider element 504, overlaid onto the first image 502a, or any other suitable location in the interface 500. In some embodiments, to alert the operator that the image data includes interpolated images, the interface 500 can initialize the slider element 504 with the arrow 506 at the location of one of the interpolated images and so that the interpolated image is initially displayed as the first image 502a. Alternatively or in combination, the interface 500 can output a notification (e.g., a dialog box) informing the operator that the image data includes interpolated images, and, optionally, the number and/or locations of the interpolated images.

Referring next to FIG. 5B, the slider element 504 can also include a set of second visual indicators 520 (e.g., markers, shapes, icons, etc.) showing the locations of one or more target sites in the imaged anatomic region. The target site(s) can be any location of interest in the anatomy, such as a lesion or nodule to be biopsied, treated, etc. The target site(s) can be identified in the image data using any suitable technique, such as manually by the operator, automatically by a suitable computing system or device, or a combination thereof. The locations of the images depicting the target site(s) can be represented via the positioning of the second visual indicators 520 along the slider element 504. The second visual indicators 520 can be differentiated from the first visual indicators 510, e.g., using different colors, shapes, labels, etc.

In some embodiments, when the operator selects one of the second visual indicators 520 (e.g., by clicking on or near the second visual indicator 520), the interface 500 switches the displayed first image 502a to show the corresponding image slice with the target site. The interface 500 can display a third label 522 (e.g., "Target 1") notifying the operator that the displayed first image 502a includes a target site. The third label 522 can be positioned near the slider element 504, overlaid onto the first image 502a, or any other suitable location in the interface 500.

Optionally, the interface 500 can inform the operator if one or more images were removed or otherwise excluded from the combined section of the image data. For example, the slider element 504 can include a set of third visual indicators (e.g., markers, shapes, icons, etc.—not shown) representing the locations of images that were removed or otherwise excluded from the combined section of the image data. In such embodiments, the operator can click or otherwise select the third visual indicators to view the corresponding removed image, e.g., to verify whether removal of the image was appropriate. The interface 500 can optionally allow the operator to toggle between showing and hiding the removed images in the displayed image data. In other embodiments, however, the interface 500 may not display any removed images, and can instead simply output a notification (e.g., a dialog box) informing the operator that images were removed, and, optionally, the number and/or locations of the removed images. Alternatively or in combination, to alert the operator that images were removed, the interface 500 can initialize the slider element 504 with the arrow 506 at the location of one of the removed images (if the removed images are displayed) or at the location of an image adjacent or close to the removed images (if the removed images are not displayed).

In some embodiments, the slider element 504 is always displayed in the interface 500. In other embodiments, however, the slider element 504 can be hidden when not in use. For example, the slider element 504 can be displayed when the operator is interacting with the slider element 504 (e.g., the cursor is over or near the slider element 504, the operator is clicking on the slider element 504, etc.). When the operator is no longer interacting with the slider element 504 (e.g., the cursor is sufficiently far from the slider element 504 for a sufficient long period of time), the interface 500 can fade out or otherwise stop displaying the slider element 504. The interface 500 can redisplay the slider element 504 when the operator clicks on or moves the cursor back over the location of the hidden slider element 504, inputs an appropriate command, etc.

FIG. 5C shows the interface 500 when the slider element 504 is hidden. In the illustrated embodiment, the interface 500 displays a fourth label 524 showing the slice number of the displayed first image 502a relative to the total slice count in the image data. The interface 500 can alert the operator if the displayed first image 502a is an interpolated image, includes a target site, is a removed image, or is otherwise of interest. For example, the interface 500 can use different colors for the fourth label 524 or a portion thereof (e.g., the slice number) if the first image 502a is an interpolated image, is an image containing a target, is a removed image, etc. Alternatively or in combination, the interface 500 can display appropriate labels, icons, messages, etc., overlaid onto the first image 502a and/or at any other suitable location.

Referring again to FIG. 1, in some embodiments, the method 100 includes additional steps not shown in FIG. 1. For example, after step 160, the method 100 can further include generating a 3D anatomic model from the combined section of image data from step 160. The 3D model can be generated by segmenting graphical elements in the image data that represent anatomic features. During the segmentation process, pixels or voxels generated from the image data may be partitioned into segments or elements and/or be tagged to indicate that they share certain characteristics or computed properties such as color, density, intensity, and texture. The segments or elements associated with anatomic features of the patient are then converted into a segmented anatomic model, which is generated in a model or image reference frame. To represent the model, the segmentation process may delineate sets of voxels representing the anatomic region and then apply a function, such as a marching cube function, to generate a 3D surface that encloses the voxels. The model may be made by generating a mesh, volume, or voxel map. Additionally or alternatively, the model may include a centerline model that includes a set of interconnected line segments or points extending through the centers of the modeled passageways. Where the model includes a centerline model including a set of interconnected line segments, those line segments may be converted to a cloud or set of points. By converting the line segments, a desired quantity of points corresponding to the interconnected line segments can be selected manually or automatically.

The 3D model can subsequently be used to plan and/or perform a medical procedure. For example, referring again to FIG. 5A, the interface 500 can display a representation of the 3D model 530 together with the images 502a-c so the operator can verify the accuracy of the 3D model 530. The operator can also use the interface 500 to modify the 3D model 530, determine a path through the patient anatomy to reach a target site, and/or any other suitable operations related to the medical procedure.

Although the steps of the method 100 of FIG. 1 are discussed and illustrated in a particular order, a person of ordinary skill in the relevant art will recognize that the method 100 can be altered and still remain within these and other embodiments. In other embodiments, for example, the method 100 can be performed in a different order, e.g., any of the steps of the method 100 can be performed before, during, and/or after any of the other steps of the method 100. Additionally, one or more steps of the method 100 illustrated in FIG. 1 can be omitted. Optionally, one or more steps of the method 100 can be repeated. For example, as described above, some or all of steps 130-160 can be repeated with different first sections selected in step 130, and the best result (e.g., the combined section with most images and/or anatomic coverage) can be used to generate the 3D model for the medical procedure. Moreover, any of the steps of the method 100 can be performed by a computing system or device, manually by an operator, or any suitable combination thereof. In some embodiments, for example, some or all of steps 110-160 are performed automatically by the computing system or device, with little or no human intervention. In other embodiments, however, any of steps 110-160 can be performed based on input (e.g., instructions, feedback, etc.) from a human operator.

B. EMBODIMENTS OF ROBOTIC OR TELEOPERATED MEDICAL SYSTEMS AND ASSOCIATED DEVICES, SYSTEMS, AND METHODS

Figure 6:
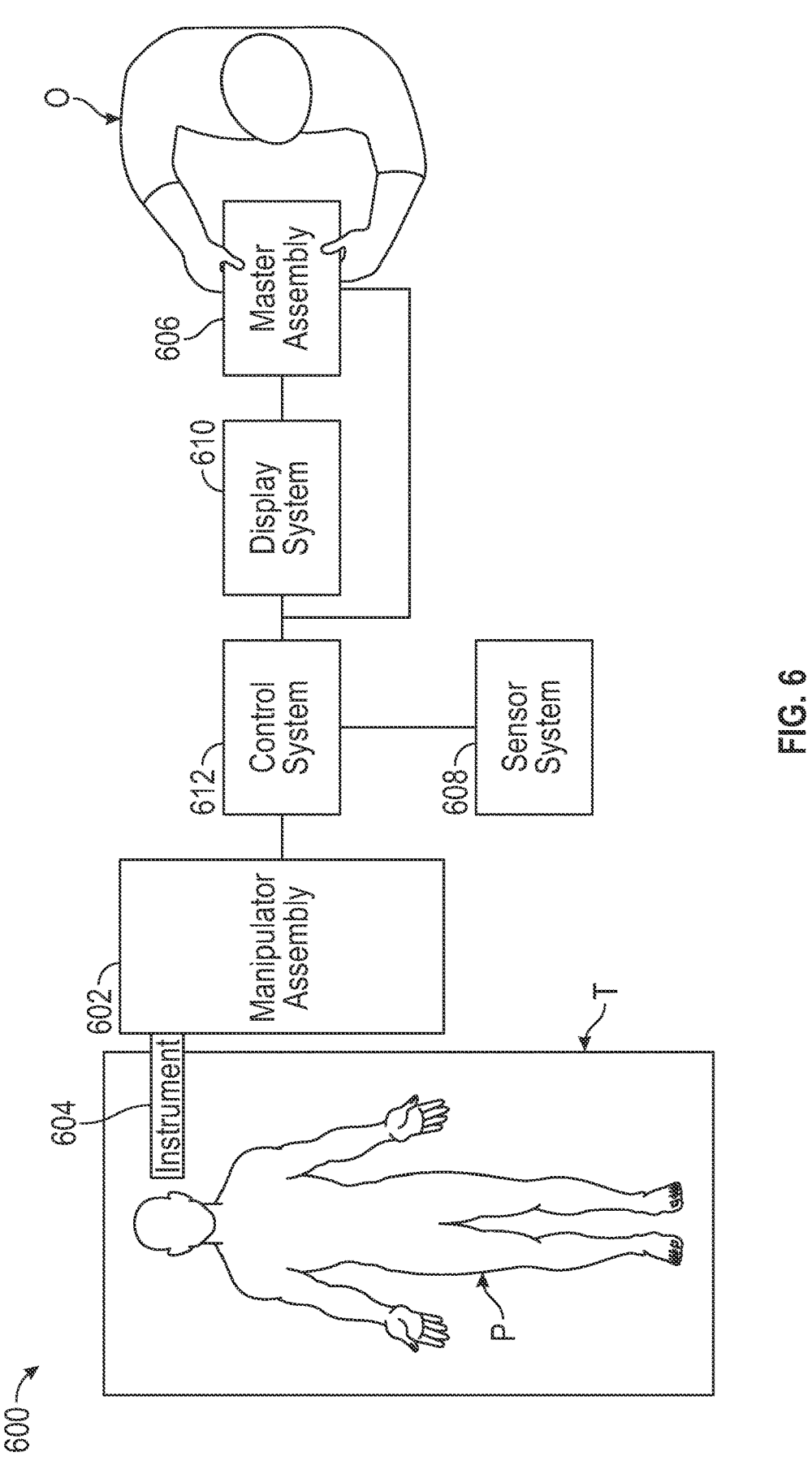
FIG. 6 is a simplified diagram of a teleoperated medical system configured in accordance with various embodiments.

FIG. 6 is a schematic representation of a robotic or teleoperated medical system 600 ("medical system 600") configured in accordance with various embodiments. The medical system 600 can be used with any of the procedures or methods described above with respect to FIGS. 1-5C. For example, an operator can use the medical system 600 to process image data and/or generate an anatomic model from the image data, as previously described. The anatomic model can be used to plan and/or facilitate a medical procedure performed using the medical system 600.

In some embodiments, the medical system 600 may be suitable for use in, for example, surgical, diagnostic, therapeutic, or biopsy procedures. While some embodiments are provided herein with respect to such procedures, any reference to medical or surgical instruments and medical or surgical methods is non-limiting. The systems, instruments, and methods described herein may be used for animals, human cadavers, animal cadavers, portions of human or animal anatomy, non-surgical diagnosis, as well as for industrial systems and general robotic or teleoperational systems.

As shown in FIG. 6, the medical system 600 generally includes a manipulator assembly 602 for operating a medical instrument 604 in performing various procedures on a patient P positioned on a table T. The manipulator assembly 602 may be teleoperated, non-teleoperated, or a hybrid teleoperated and non-teleoperated assembly with select degrees of freedom of motion that may be motorized and/or teleoperated and select degrees of freedom of motion that may be non-motorized and/or non-teleoperated.

The medical system 600 further includes a master assembly 606 having one or more control devices for controlling the manipulator assembly 602. The manipulator assembly 602 supports the medical instrument 604 and may optionally include a plurality of actuators or motors that drive inputs on the medical instrument 604 in response to commands from a control system 612. The actuators may optionally include drive systems that when coupled to the medical instrument 604 may advance the medical instrument 604 into a naturally or surgically created anatomic orifice. Other drive systems may move the distal end of the medical instrument 604 in multiple degrees of freedom, which may include three degrees of linear motion (e.g., linear motion along the X, Y, and Z Cartesian axes) and in three degrees of rotational motion (e.g., rotation about the X, Y, and Z Cartesian axes). Additionally, the actuators can be used to actuate an articulable end effector of the medical instrument 604 for grasping tissue in the jaws of a biopsy device and/or the like. Actuator position sensors such as resolvers, encoders, potentiometers, and other mechanisms may provide sensor data to the medical system 600 describing the rotation and orientation of the motor shafts. This position sensor data may be used to determine motion of the objects manipulated by the actuators.

The medical system 600 also includes a display system 610 for displaying an image or representation of the surgical site and the medical instrument 604 generated by subsystems of a sensor system 608. For example, the display system 610 can display image data processed in accordance with the techniques described herein and/or an anatomic model produced from such image data. Optionally, the display system 610 can display auxiliary information related to a procedure, such as information related to ablation (e.g., temperature, impedance, energy delivery power levels, frequency, current, energy delivery duration, indicators of tissue ablation, etc.). The display system 610 and the master assembly 606 may be oriented so an operator O can control the medical instrument 604 and the master assembly 606 with the perception of telepresence.

In some embodiments, the medical instrument 604 may include components of an imaging system, which may include an imaging scope assembly or imaging instrument that records a concurrent or real-time image of a surgical site and provides the image to the operator O through one or more displays of the medical system 600, such as one or more displays of the display system 610. The concurrent image may be, for example, a two or three-dimensional image captured by an imaging instrument positioned within the surgical site. In some embodiments, the imaging system includes endoscopic imaging instrument components that may be integrally or removably coupled to the medical instrument 604. In some embodiments, however, a separate endoscope, attached to a separate manipulator assembly may be used with the medical instrument 604 to image the surgical site. In some embodiments, the imaging system includes a channel (not shown) that may provide for delivery of instruments, devices, catheters, etc., as described herein. The imaging system may be implemented as hardware, firmware, software, or a combination thereof which interact with or are otherwise executed by one or more computer processors, which may include the processors of the control system 612.

The medical system 600 may also include the control system 612. The control system 612 includes at least one memory and at least one computer processor (not shown) for effecting control between the medical instrument 604, the master assembly 606, the sensor system 608, and the display system 610. The control system 612 also includes programmed instructions (e.g., a non-transitory machine-readable medium storing the instructions) to implement some or all of the methods described in accordance with aspects disclosed herein, including instructions for providing information to the display system 610.

The control system 612 may optionally further include a virtual visualization system to provide navigation assistance to the operator O when controlling the medical instrument 604 during an image-guided surgical procedure. Virtual navigation using the virtual visualization system may be based upon reference to an acquired preoperative or intraoperative dataset of anatomic passageways. The virtual visualization system processes images of the surgical site imaged using imaging technology such as CT, MRI, fluoroscopy, thermography, ultrasound, OCT, thermal imaging, impedance imaging, laser imaging, nanotube X-ray imaging, and/or the like.

Figures 7A, 7B:
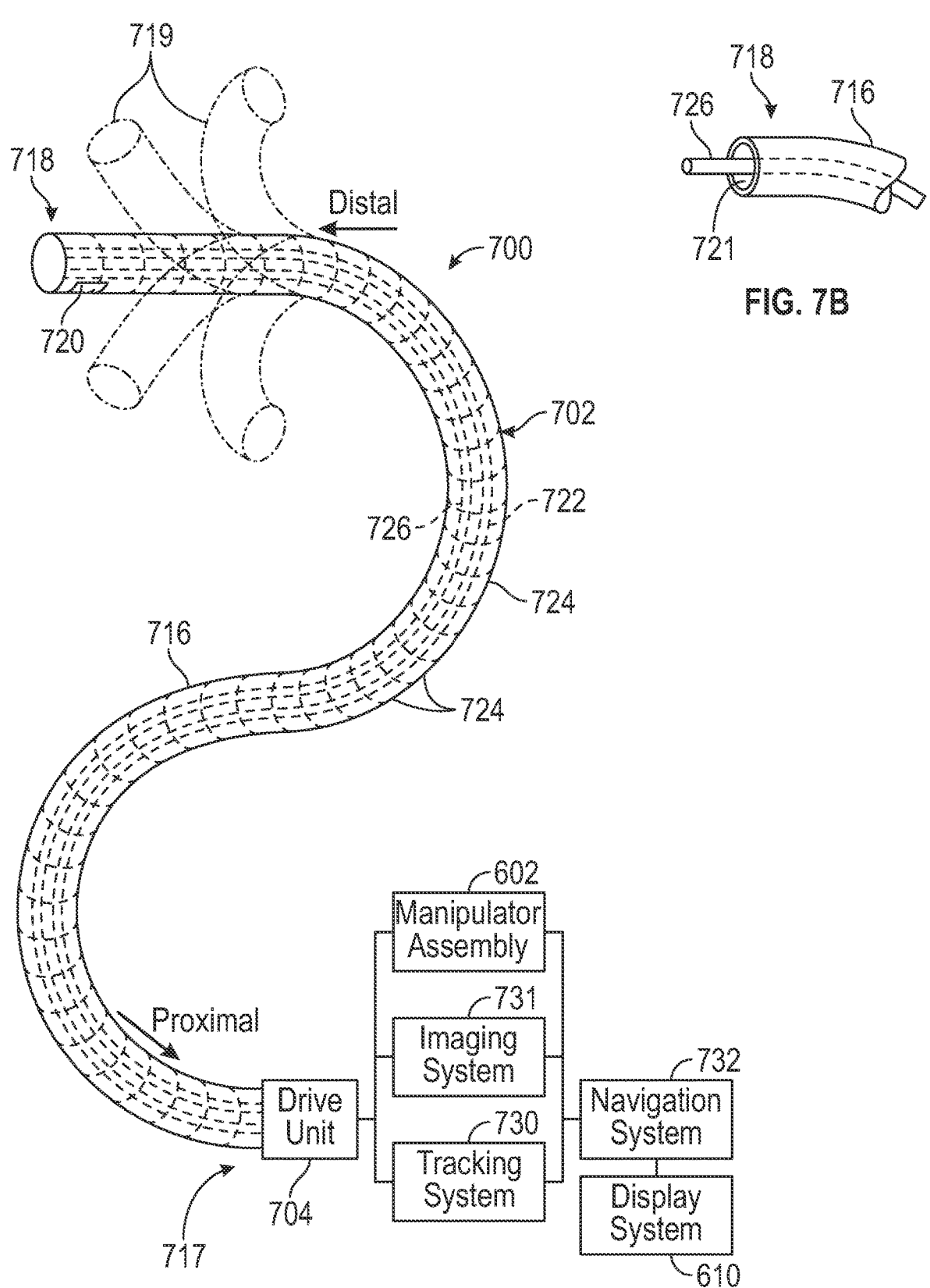
FIG. 7A is a simplified diagram of a medical instrument system configured in accordance with various embodiments.
FIG. 7B is a simplified diagram of a medical instrument system configured in accordance with various embodiments.

FIG. 7A is a simplified diagram of a medical instrument system 700 configured in accordance with various embodiments. The medical instrument system 700 includes an elongate flexible device 702, such as a flexible catheter, coupled to a drive unit 704. The elongate flexible device 702 includes a flexible body 716 having a proximal end 717 and a distal end or tip portion 718. The medical instrument system 700 further includes a tracking system 730 for determining the position, orientation, speed, velocity, pose, and/or shape of the distal end 718 and/or of one or more segments 724 along the flexible body 716 using one or more sensors and/or imaging devices as described in further detail below.

The tracking system 730 may optionally track the distal end 718 and/or one or more of the segments 724 using a shape sensor 722. The shape sensor 722 may optionally include an optical fiber aligned with the flexible body 716 (e.g., provided within an interior channel (not shown) or mounted externally). The optical fiber of the shape sensor 722 forms a fiber optic bend sensor for determining the shape of the flexible body 716. In one alternative, optical fibers including Fiber Bragg Gratings (FBGs) are used to provide strain measurements in structures in one or more dimensions. Various systems and methods for monitoring the shape and relative position of an optical fiber in three dimensions are described in U.S. Pat. No. 7,781,724, filed Sep. 26, 2006, disclosing "Fiber Optic Position and Shape Sensing Device and Method Relating Thereto"; U.S. Pat. No. 7,772,541, filed Mar. 12, 2008, disclosing "Fiber Optic Position and/or Shape Sensing Based on Rayleigh Scatter"; and U.S. Pat. No. 6,389,187, filed Apr. 21, 2000, disclosing "Optical Fiber Bend Sensor," which are all incorporated by reference herein in their entireties. In some embodiments, the tracking system 730 may optionally and/or additionally track the distal end 718 using a position sensor system 720. The position sensor system 720 may be a component of an EM sensor system with the position sensor system 720 including one or more conductive coils that may be subjected to an externally generated electromagnetic field. In some embodiments, the position sensor system 720 may be configured and positioned to measure six degrees of freedom (e.g., three position coordinates X, Y, and Z and three orientation angles indicating pitch, yaw, and roll of a base point) or five degrees of freedom (e.g., three position coordinates X, Y, and Z and two orientation angles indicating pitch and yaw of a base point). Further description of a position sensor system is provided in U.S. Pat. No. 6,380,732, filed Aug. 9, 1999, disclosing "Six-Degree of Freedom Tracking System Having a Passive Transponder on the Object Being Tracked," which is incorporated by reference herein in its entirety. In some embodiments, an optical fiber sensor may be used to measure temperature or force. In some embodiments, a temperature sensor, a force sensor, an impedance sensor, or other types of sensors may be included within the flexible body. In various embodiments, one or more position sensors (e.g. fiber shape sensors, EM sensors, and/or the like) may be integrated within the medical instrument 726 and used to track the position, orientation, speed, velocity, pose, and/or shape of a distal end or portion of medical instrument 726 using the tracking system 730.

The flexible body 716 includes a channel 721 sized and shaped to receive a medical instrument 726. FIG. 7B, for example, is a simplified diagram of the flexible body 716 with the medical instrument 726 extended according to some embodiments. In some embodiments, the medical instrument 726 may be used for procedures such as imaging, visualization, surgery, biopsy, ablation, illumination, irrigation, and/or suction. The medical instrument 726 can be deployed through the channel 721 of the flexible body 716 and used at a target location within the anatomy. The medical instrument 726 may include, for example, energy delivery instruments (e.g., an ablation probe), image capture probes, biopsy instruments, laser ablation fibers, and/or other surgical, diagnostic, or therapeutic tools. The medical instrument 726 may be used with an imaging instrument (e.g., an image capture probe) within the flexible body 716. The imaging instrument may include a cable coupled to the camera for transmitting the captured image data. In some embodiments, the imaging instrument may be a fiber-optic bundle, such as a fiberscope, that couples to an image processing system 731. The imaging instrument may be single or multi-spectral, for example capturing image data in one or more of the visible, infrared, and/or ultraviolet spectrums. The medical instrument 726 may be advanced from the opening of channel 721 to perform the procedure and then be retracted back into the channel 721 when the procedure is complete. The medical instrument 726 may be removed from the proximal end 717 of the flexible body 716 or from another optional instrument port (not shown) along the flexible body 716.

The flexible body 716 may also house cables, linkages, or other steering controls (not shown) that extend between the drive unit 704 and the distal end 718 to controllably bend the distal end 718 as shown, for example, by broken dashed line depictions 719 of the distal end 718. In some embodiments, at least four cables are used to provide independent "up-down" steering to control a pitch of the distal end 718 and "left-right" steering to control a yaw of the distal end 718. Steerable elongate flexible devices are described in detail in U.S. Pat. No. 9,452,276, filed Oct. 14, 2011, disclosing "Catheter with Removable Vision Probe," and which is incorporated by reference herein in its entirety. In various embodiments, medical instrument 726 may be coupled to drive unit 704 or a separate second drive unit (not shown) and be controllably or robotically bendable using steering controls.

The information from the tracking system 730 may be sent to a navigation system 732 where it is combined with information from the image processing system 731 and/or the preoperatively obtained models to provide the operator with real-time position information. In some embodiments, the real-time position information may be displayed on the display system 610 of FIG. 6 for use in the control of the medical instrument system 700. In some embodiments, the control system 612 of FIG. 6 may utilize the position information as feedback for positioning the medical instrument system 700. Various systems for using fiber optic sensors to register and display a surgical instrument with surgical images are provided in U.S. Pat. No. 8,900,131, filed May 13, 2011, disclosing "Medical System Providing Dynamic Registration of a Model of an Anatomic Structure for Image-Guided Surgery," which is incorporated by reference herein in its entirety.

In some embodiments, the medical instrument system 700 may be teleoperated within the medical system 600 of FIG. 6. In some embodiments, the manipulator assembly 602 of FIG. 6 may be replaced by direct operator control. In some embodiments, the direct operator control may include various handles and operator interfaces for hand-held operation of the instrument.

C. CONCLUSION

The systems and methods described herein can be provided in the form of tangible and non-transitory machine-readable medium or media (such as a hard disk drive, hardware memory, optical medium, semiconductor medium, magnetic medium, etc.) having instructions recorded thereon for execution by a processor or computer. The set of instructions can include various commands that instruct the computer or processor to perform specific operations such as the methods and processes of the various embodiments described here. The set of instructions can be in the form of a software program or application. Programmed instructions may be implemented as a number of separate programs or subroutines, or they may be integrated into a number of other aspects of the systems described herein. The computer storage media can include volatile and non-volatile media, and removable and non-removable media, for storage of information such as computer-readable instructions, data structures, program modules or other data. The computer storage media can include, but are not limited to, RAM, ROM, EPROM, EEPROM, flash memory or other solid-state memory technology, CD-ROM, DVD, or other optical storage, magnetic disk storage, or any other hardware medium which can be used to store desired information and that can be accessed by components of the system. Components of the system can communicate with each other via wired or wireless communication. In one embodiment, the control system supports wireless communication protocols such as Bluetooth, IrDA, HomeRF, IEEE 802.11, DECT, and Wireless Telemetry. The components can be separate from each other, or various combinations of components can be integrated together into a monitor or processor or contained within a workstation with standard computer hardware (for example, processors, circuitry, logic circuits, memory, and the like). The system can include processing devices such as microprocessors, microcontrollers, integrated circuits, control units, storage media, and other hardware.

Note that the processes and displays presented may not inherently be related to any particular computer or other apparatus. Various general-purpose systems may be used with programs in accordance with the teachings herein, or it may prove convenient to construct a more specialized apparatus to perform the operations described. The required structure for a variety of these systems will appear as elements in the claims. In addition, the embodiments of the invention are not described with reference to any particular programming language. It will be appreciated that a variety of programming languages may be used to implement the teachings of the invention as described herein.

Medical tools that may be delivered through the elongate flexible devices or catheters disclosed herein may include, for example, image capture probes, biopsy instruments, laser ablation fibers, and/or other surgical, diagnostic, or therapeutic tools. Medical tools may include end effectors having a single working member such as a scalpel, a blunt blade, an optical fiber, an electrode, and/or the like. Other end effectors may include, for example, forceps, graspers, scissors, clip appliers, and/or the like. Other end effectors may further include electrically activated end effectors such as electrosurgical electrodes, transducers, sensors, and/or the like. Medical tools may include image capture probes that include a stereoscopic or monoscopic camera for capturing images (including video images). Medical tools may additionally house cables, linkages, or other actuation controls (not shown) that extend between their proximal and distal ends to controllably bend the distal ends of the tools. Steerable instruments are described in detail in U.S. Pat. No. 7,316, 681, filed Oct. 4, 2005, disclosing "Articulated Surgical Instrument for Performing Minimally Invasive Surgery with Enhanced Dexterity and Sensitivity" and U.S. Pat. No. 9,259,274, filed Sep. 30, 2008, disclosing "Passive Preload and Capstan Drive for Surgical Instruments," which are incorporated by reference herein in their entireties.

The systems described herein may be suited for navigation and treatment of anatomic tissues, via natural or surgically created connected passageways, in any of a variety of anatomic systems, including the lung, colon, stomach, intestines, kidneys and kidney calices, bladder, liver, gall bladder, pancreas, spleen, ureter, ovaries, uterus, brain, the circulatory system including the heart, vasculature, and/or the like.

Although many of the embodiments are described above in the context of navigating and performing medical procedures within lungs of a patient, other applications and other embodiments in addition to those described herein are within the scope of the disclosure. For example, unless otherwise specified or made clear from context, the devices, systems, methods, and computer program products discussed herein can be used for various image-guided medical procedures, such as medical procedures performed on, in, or adjacent hollow patient anatomy, and, more specifically, in procedures for surveying, biopsying, ablating, or otherwise treating tissue within and/or proximal the hollow patient anatomy. Thus, for example, the systems, devices, methods, and computer program products of the present disclosure can be used in one or more medical procedures associated with other patient anatomy, such as the bladder, urinary tract, GI system, and/or heart of a patient.

This disclosure describes various instruments and portions of instruments in terms of their state in three-dimensional space. As used herein, the term "position" refers to the location of an object or a portion of an object in a three-dimensional space (e.g., three degrees of translational freedom along Cartesian x-, y-, and z-coordinates). As used herein, the term "orientation" refers to the rotational placement of an object or a portion of an object (three degrees of rotational freedom—e.g., roll, pitch, and yaw). As used herein, the term "pose" refers to the position of an object or a portion of an object in at least one degree of translational freedom and to the orientation of that object or portion of the object in at least one degree of rotational freedom (up to six total degrees of freedom). As used herein, the term "shape" refers to a set of poses, positions, or orientations measured along an object.

As used herein, the term "operator" shall be understood to include any type of personnel who may be performing or assisting a medical procedure and, thus, is inclusive of a physician, a surgeon, a doctor, a nurse, a medical technician, other personnel or user of the technology disclosed herein, and any combination thereof. Additionally, or alternatively, the term "patient" should be considered to include human and/or non-human (e.g., animal) patients upon which a medical procedure is being performed.

While certain exemplary embodiments of the invention have been described and shown in the accompanying drawings, it is to be understood that such embodiments are merely illustrative of and not restrictive on the broad invention, and that the embodiments of the invention are not limited to the specific constructions and arrangements shown and described, since various other modifications may occur to those ordinarily skilled in the art. The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments can perform steps in a different order. Furthermore, the various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any materials incorporated herein by reference conflict with the present disclosure, the present disclosure controls. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and both A and B. Where the context permits, singular or plural terms can also include the plural or singular term, respectively. Additionally, the terms "comprising," "including," "having" and "with" are used throughout to mean including at least the recited feature(s) such that any greater number of the same feature and/or additional types of other features are not precluded.

Furthermore, as used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

From the foregoing, it will also be appreciated that various modifications can be made without deviating from the technology. For example, various components of the technology can be further divided into subcomponents, or various components and functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A system for processing medical image data, the system comprising:
   a processor; and
   a memory operably coupled to the processor and storing instructions that, when executed by the processor, cause the system to perform operations comprising:
   receiving image data of a patient's anatomy, the image data including a sequence of image slices;
   determining a first section of the image data, wherein each image interval between consecutive image slices in the first section has an interval size comprising a distance that is within a predetermined size range;
   identifying a second section of the image data, wherein the second section includes at least one image interval having an interval size comprising a distance that is outside the predetermined size range;
   generating a resampled second section by adding one or more interpolated image slices in the second section, wherein each image interval in the resampled second section has an interval size comprising a distance that is within the predetermined size range; and
   outputting a combined section of the image data including the first section and the resampled second section.

2. The system of claim 1 wherein generating the resampled second section includes deleting an original image slice of the sequence of image slices from the second section of the image data.

3. The system of claim 1 wherein the predetermined size range is less than or equal to 2 mm.

4. The system of claim 1 wherein the second section includes: (a) one or more image slices in a first direction relative to the first section, (b) one or more image slices in a second direction relative to the first section, or both (a) and (b).

5. The system of claim 4 wherein the first direction is a superior direction and the second direction is an inferior direction.

6. The system of claim 1 wherein each image interval in the second section has an interval size less than or equal to a maximum interval size.

7. The system of claim 1 wherein determining the first section includes:

identifying a plurality of sections of the image data, wherein each image interval in each section has an interval size within the predetermined size range; and selecting a largest identified section of the plurality of sections.

8. The system of claim 1 wherein determining the first section includes:

identifying a plurality of sections of the image data, wherein each image interval in each section has an interval size within the predetermined size range; and selecting an identified section that is predicted to generate a largest combined section after generating the resampled second section.

9. The system of claim 1 wherein the operations further comprise determining whether a total number of image slices in the combined section is within an image number range.

10. The system of claim 9 wherein the image number range is from 50 images to 1200 images.

11. The system of claim 1 wherein generating the resampled second section includes adding no more than two interpolated image slices between at least one pair of consecutive image slices in the second section.

12. The system of claim 1 wherein generating the resampled second section includes deleting one or more original image slices in the second section and replacing the deleted one or more original image slices with the one or more interpolated image slices.

13. The system of claim 1 wherein the interval size of the resampled second section is identical or similar to the interval size of the first section.

14. The system of claim 1 wherein the operations further comprise determining whether the combined section includes a target site of a planned medical procedure.

15. The system of claim 1 wherein the image data includes a plurality of computed tomography image slices.

16. The system of claim 1 wherein the operations further comprise generating a model of the patient's anatomy using the combined section of the image data.

17. The system of claim 1 wherein the second section of the image data is adjacent to the first section of the image data.

18. A system for processing medical image data, the system comprising:

a processor; and a memory operably coupled to the processor and storing instructions that, when executed by the processor, cause the system to perform operations comprising:

receiving image data of a patient's anatomy, the image data including a sequence of images;

determining a first section of the image data, wherein each image interval in the first section has an interval size within a predetermined size range;

identifying a second section of the image data, wherein the second section includes at least one image interval having an interval size outside the predetermined size range;

generating a resampled second section by adding one or more interpolated images in the second section, wherein each image interval in the resampled second section has an interval size within the predetermined size range; and outputting a combined section of the image data including the first section and the resampled second section, wherein each image interval in the second section has an interval size less than or equal to a maximum interval size and the maximum interval size is 2.5 mm, 4 mm, or between 2.5 mm and 4 mm.

19. A system of for processing medical image data, the system comprising:

a processor; and a memory operably coupled to the processor and storing instructions that, when executed by the processor, cause the system to perform operations comprising:

receiving image data of a patient's anatomy, the image data including a sequence of images;

determining a first section of the image data, wherein each image interval in the first section has an interval size within a predetermined size range;

identifying a second section of the image data, wherein the second section includes at least one image interval having an interval size outside the predetermined size range;

generating a resampled second section by adding one or more interpolated images in the second section, wherein each image interval in the resampled second section has an interval size within the predetermined size range;

outputting a combined section of the image data including the first section and the resampled second section; and determining whether the combined section includes a target site of a planned medical procedure, wherein determining whether the combined section provides sufficient coverage comprises:

identifying one or more excluded sections of the image data separate from the combined section; and determining whether a coverage amount of each excluded section is less than or equal to a respective coverage threshold.

20. The system of claim 19 wherein:

the one or more excluded sections include a third section superior to the combined section, and a fourth section inferior to the combined section;

the coverage threshold for the third section is 30 mm; and the coverage threshold for the fourth section is 50 mm.

* * * * *